US011277518B2

United States Patent
Li et al.

(10) Patent No.: US 11,277,518 B2
(45) Date of Patent: Mar. 15, 2022

(54) HOWL DETECTION IN CONFERENCE SYSTEMS

(71) Applicant: DOLBY LABORATORIES LICENSING CORPORATION, San Francisco, CA (US)

(72) Inventors: Kai Li, Beijing (CN); David Gunawan, Sydney (AU); Feng Deng, Beijing (CN); Qianqian Fang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/640,169

(22) PCT Filed: Sep. 27, 2018

(86) PCT No.: PCT/US2018/053119
§ 371 (c)(1),
(2) Date: Feb. 19, 2020

(87) PCT Pub. No.: WO2019/067718
PCT Pub. Date: Apr. 4, 2019

(65) Prior Publication Data
US 2021/0136230 A1     May 6, 2021

Related U.S. Application Data

(60) Provisional application No. 62/575,701, filed on Oct. 23, 2017.

(30) Foreign Application Priority Data

Sep. 29, 2017 (WO) ................ PCT/CN2017/104604
Nov. 10, 2017 (EP) ..................................... 17201011

(51) Int. Cl.
*H04M 3/56*     (2006.01)
*G10L 25/48*     (2013.01)

(52) U.S. Cl.
CPC ............. *H04M 3/568* (2013.01); *G10L 25/48* (2013.01)

(58) Field of Classification Search
CPC ......... H04M 3/568; H04M 2203/2094; H04M 9/08; H04M 9/082; H04M 3/002;
(Continued)

(56) References Cited

U.S. PATENT DOCUMENTS 6,246,760 B1 * 6/2001 Makino ................ H04M 9/082
379/406.08
8,462,193 B1     6/2013 Truong
(Continued)

FOREIGN PATENT DOCUMENTS

| CN | 101511050 | 8/2009 |
| CN | 102740214 | 10/2012 |

(Continued)

OTHER PUBLICATIONS https://en.wikipedia.org/wiki/Audio_feedback.
(Continued)

*Primary Examiner* — Akelaw Teshale

(57) ABSTRACT

The disclosed teleconferencing methods involve detecting a howl state during a teleconference which involves two or more teleconference client locations and a teleconference server. The teleconference server is configured for providing full-duplex audio connectivity between the teleconference client locations. The howl state is a state of acoustic feedback involving two or more teleconference devices in a teleconference client location. Detecting the howl state involves an analysis of both spectral and temporal characteristics of teleconference audio data. The disclosed teleconferencing methods involve determining which client location is causing the howl state and involve mitigating the howl state or sending a howl state detection message.

13 Claims, 13 Drawing Sheets

(58) Field of Classification Search
CPC .......... H04M 3/56; H04M 1/02; H04M 1/035; H04M 1/2535; H04M 1/6033; H04M 2203/055; H04M 2203/5027; H04M 2203/509; H04M 3/22; H04M 3/34; H04M 3/567; H04M 3/569; H04M 9/087; G10L 25/48; H04R 3/02; H04R 25/453; H04R 25/505; H04R 3/005; H04R 2225/43; H04R 2225/67; H04R 25/405; H04R 25/407; H04R 25/305; H04R 25/606; H04R 25/70; H04R 2225/025; H04R 25/554; H04R 2225/41; H04R 25/552; H04R 27/00; H04R 1/028; H04R 2225/61; H04R 1/406; H04R 2430/03; H04R 25/00; H04R 25/356; H04R 25/40; H04R 2201/403; H04R 2225/021; H04R 2225/51; H04R 25/43; H04R 25/60; H04R 25/602; H04R 1/1041; H04R 1/1083; H04R 2203/12; H04R 2225/0213; H04R 2410/01; H04R 2410/05; H04R 2460/13; H04R 2460/15; H04R 25/30; H04R 25/50; H04R 25/558; H04R 3/04; H04R 1/08; H04R 1/326; H04R 2225/0216; H04R 2225/83; H04R 2227/001; H04R 2227/007; H04R 2420/07; H04R 2420/09; H04R 2460/01; H04R 2499/11; H04R 2499/13; H04R 25/353; H04R 25/45; H04R 25/456; H04R 29/001; H04R 3/12; H04R 5/027; H04R 5/04

See application file for complete search history.

(56) References Cited

U.S. PATENT DOCUMENTS

| | | | | |
|---|---|---|---|---|
| 10,687,152 | B2* | 6/2020 | Kuriger | H04R 25/43 |
| 2004/0076271 | A1* | 4/2004 | Koistinen | G10L 19/005 |
| | | | | 379/88.11 |
| 2005/0018836 | A1* | 1/2005 | Beaucoup | H04R 27/00 |
| | | | | 379/406.01 |
| 2005/0175189 | A1* | 8/2005 | Lee | H04M 9/082 |
| | | | | 381/92 |
| 2006/0227978 | A1* | 10/2006 | Truong | H04M 9/082 |
| | | | | 381/66 |
| 2007/0121928 | A1* | 5/2007 | Beaucoup | H04M 9/082 |
| | | | | 379/406.08 |
| 2008/0112568 | A1* | 5/2008 | Sakuraba | H04M 9/082 |
| | | | | 381/66 |
| 2008/0260172 | A1* | 10/2008 | Sakuraba | H04M 9/082 |
| | | | | 381/66 |
| 2010/0322387 | A1* | 12/2010 | Cutler | H04M 3/2236 |
| | | | | 379/32.01 |
| 2017/0070827 | A1* | 3/2017 | Guo | H04R 25/453 |
| 2017/0104867 | A1 | 4/2017 | Kim | |

FOREIGN PATENT DOCUMENTS

| | | |
|---|---|---|
| CN | 105516876 | 4/2016 |
| WO | 2016130459 | 8/2016 |

OTHER PUBLICATIONS

Waterschoot, Toot Van, et al "Fifty Years of Acoustic Feedback Control: State of the Art and Future Challenges, Proceedings of the IEEE, vol. 99, No. 2, Feb. 2011".

* cited by examiner

HOWL DETECTION IN CONFERENCE SYSTEMS

CROSS REFERENCE TO RELATED APPLICATION

This application claims priority to International Patent Application No. PCT/CN2017/104604, filed Sep. 29, 2017, U.S. Provisional Application No. 62/575,701, filed Oct. 23, 2017 and European Patent Application No. 17201011.8, filed Nov. 10, 2017, each incorporated by reference in its entirety.

TECHNICAL FIELD

This disclosure relates to the processing of audio signals. In particular, this disclosure relates to processing audio signals related to teleconferencing or video conferencing.

BACKGROUND

Acoustic feedback is a type of feedback that occurs when a sound loop exists between an audio input (e.g., a microphone) and an audio output (for example, a loudspeaker). For example, a signal received by the microphone may be amplified and reproduced by the loudspeaker. The reproduced sound from the loudspeaker may then be received by the microphone again, amplified further, and then reproduced by the loudspeaker again at a higher amplitude or volume level. In this type of system, the sound of the acoustic feedback may be a loud screech or squeal, which may be referred to herein as a "howl." In some instances, guitarists and other performers may intentionally create howl (e.g., between a guitar pickup and a loudspeaker) in order to produce desired musical effects. Although some methods have proven to successfully detect and mitigate unintentionally-produced howl, this problem has proven to be more difficult to solve in the context of teleconferencing.

SUMMARY

Various methods are disclosed herein. Some teleconferencing methods may involve detecting a howl state during a teleconference involving two or more client locations and determining which client location is causing the howl state. The teleconference may involve two or more teleconference client locations and a teleconference server. The teleconference server may be configured for providing full-duplex audio connectivity between the teleconference client locations. The howl state may be a state of acoustic feedback involving two or more teleconference devices in a teleconference client location. Detecting the howl state may involve an analysis of both spectral and temporal characteristics of teleconference audio data. In some examples, the method may involve mitigating the howl state and/or sending a howl state detection message.

According to some examples, the teleconference server may determine which client location is causing the howl state. In some implementations, the teleconference server may detect the howl state.

In some such examples, a teleconference device at a teleconference client location may perform a howl feature extraction process on at least some of the teleconference audio data. The howl feature extraction process may yield howl feature data. The teleconference device may send the howl feature data to the teleconference server. The teleconference server may detect the howl state based, at least in part, on the howl feature data.

According to some implementations, the teleconference server may detect the howl state based, at least in part, on teleconference audio data received from one or more of the teleconference client locations. In some such implementations, the teleconference server may create a teleconference audio data mix comprising teleconference audio data received from the teleconference client locations. The teleconference server may, in some examples, detect the howl state based on the teleconference audio data mix.

According to some such examples, the teleconference server may receive teleconference metadata from the teleconference client locations. The teleconference server may determine which client location is causing the howl state based, at least in part, on the teleconference metadata. The teleconference metadata may, for example, include voice activity detection metadata, level metadata and/or energy metadata.

In some examples, the method may involve estimating a howl presence probability according to the teleconference audio data. Detecting the howl state may be based, at least in part, on the howl presence probability. According to some such examples, the howl presence probability estimation may be based on a hierarchical rule set or a machine learning method.

According to some implementations, a howl-detection-enabled teleconference device at a teleconference client location may detect the howl state. In some such implementations, the howl-detection-enabled teleconference device may mitigate the howl state.

In some examples, detecting the howl state may involve calculating a power-based metric according to order statistics of frequency bands, calculating a spectral resonance metric; calculating an inter-percentile range metric, event aggregation, calculating a periodicity metric, detecting envelope similarity, calculating a spectral peakiness metric, a machine-learning-based process and/or estimating a howl presence probability.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in a non-transitory medium having software stored thereon. The software may, for example, include instructions for controlling at least one device to process audio data. The software may, for example, be executable by one or more components of a control system such as those disclosed herein.

The software may, for example, include instructions for performing one or more of the teleconferencing methods disclosed herein. Some such teleconferencing methods may involve detecting a howl state during a teleconference and determining which client location is causing the howl state. The teleconference may involve two or more teleconference client locations and a teleconference server. The teleconference server may be configured for providing full-duplex audio connectivity between the teleconference client locations. The howl state may be a state of acoustic feedback involving two or more teleconference devices in a teleconference client location. Detecting the howl state may involve an analysis of both spectral and temporal characteristics of teleconference audio data. In some examples, the method may involve mitigating the howl state and/or sending a howl state detection message.

At least some aspects of the present disclosure may be implemented via apparatus. For example, one or more devices may be configured for performing, at least in part, the methods disclosed herein. In some implementations, an apparatus may include an interface system and a control system. The interface system may include one or more network interfaces, one or more interfaces between the control system and a memory system, one or more interfaces between the control system and another device and/or one or more external device interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components.

In some implementations, the apparatus may be, or may be a portion of, a teleconferencing server. In some such implementations, the apparatus may include one or more line cards or blades of a teleconferencing server. According to some such examples, the apparatus may include an interface system and a control system. The interface system may be configured for communication between the teleconferencing server and teleconference client locations.

The control system may, for example, be configured for providing full-duplex audio connectivity during a teleconference between two or more teleconference client locations. The control system may be configured for detecting, during the teleconference, a howl state. The howl state may be a state of acoustic feedback involving two or more teleconference devices in a teleconference client location. Detecting the howl state may involve an analysis of both spectral and temporal characteristics of teleconference audio data. The control system may, in some examples, be configured for determining which client location is causing the howl state. In some implementations, the control system may be configured for mitigating the howl state and/or sending a howl state detection message.

According to some implementations, the control system may be configured for detecting the howl state based, at least in part, on teleconference audio data received from one or more of the teleconference client locations. In some examples, the control system may be configured for creating a teleconference audio data mix. The teleconference audio data mix may include teleconference audio data received from the teleconference client locations. The control system may, in some examples, be configured for detecting the howl state based on the teleconference audio data mix. In some such examples, the control system may be configured for receiving, via the interface system, teleconference metadata from the teleconference client locations and for determining which client location is causing the howl state based, at least in part, on the teleconference metadata. In some implementations, the teleconference metadata may include voice activity detection metadata, level metadata and/or energy metadata. According to some implementations, the control system may be configured for determining which client device is causing the howl state.

In some examples, the control system may be configured for estimating a howl presence probability according to teleconference audio data received from one or more of the teleconference client locations. According to some such examples, detecting the howl state may be based, at least in part, on the howl presence probability. In some instances, the howl presence probability estimation may be based on a hierarchical rule set and/or a machine learning process.

According to some implementations, detecting the howl state may involve calculating a power-based metric according to order statistics of frequency bands, calculating a spectral resonance metric; calculating an inter-percentile range metric, event aggregation, calculating a periodicity metric, detecting envelope similarity, calculating a spectral peakiness metric, a machine-learning-based process and/or estimating a howl presence probability.

In some examples, the control system may be configured for receiving, via the interface system, howl feature data from a teleconference device at a teleconference client location. The howl feature data may be the result of a howl feature extraction process performed by the teleconference device. The control system may be configured for detecting the howl state based, at least in part, on the howl feature data.

According to some implementations, the apparatus may be, or may be a part of, a teleconferencing client device. The teleconferencing client device may, in some examples, be a telephone, a conference phone, a laptop, etc. In some examples, the teleconferencing client device may include an interface system and a control system. The interface system may be configured for communication between the teleconference client device and a teleconferencing server. In some implementations, the teleconferencing server may be configured for providing full-duplex audio connectivity during a teleconference between a plurality of teleconference client locations.

In some instances, the control system may be configured for detecting a howl state during the teleconference. The howl state may be a state of acoustic feedback involving the teleconferencing client device and at least one other device in a teleconference client location that includes the teleconferencing client device. In some examples, detecting the howl state may involve an analysis of both spectral and temporal characteristics of teleconference audio data. According to some examples, the control system may be configured for mitigating the howl state.

According to some implementations, detecting the howl state may involve calculating a power-based metric according to order statistics of frequency bands, calculating a spectral resonance metric; calculating an inter-percentile range metric, event aggregation, calculating a periodicity metric, detecting envelope similarity, calculating a spectral peakiness metric, a machine-learning-based process and/or estimating a howl presence probability.

In some examples, the control system may be configured for performing a howl state feature extraction process during the teleconference. The howl state feature extraction process may involve extracting howl feature data that is relevant to detecting a howl state. In some implementations, the howl state feature extraction process may involve an analysis of both spectral and temporal characteristics of teleconference audio data. According to some such implementations, the control system may be configured for sending the howl feature data to the teleconferencing server.

According to some implementations, performing a howl state feature extraction process may involve calculating a power-based metric according to order statistics of frequency bands, calculating a spectral resonance metric; calculating an inter-percentile range metric, event aggregation, calculating a periodicity metric, detecting envelope similarity, calculating a spectral peakiness metric, a machine-learning-based process and/or estimating a howl presence probability.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

Figure 1:
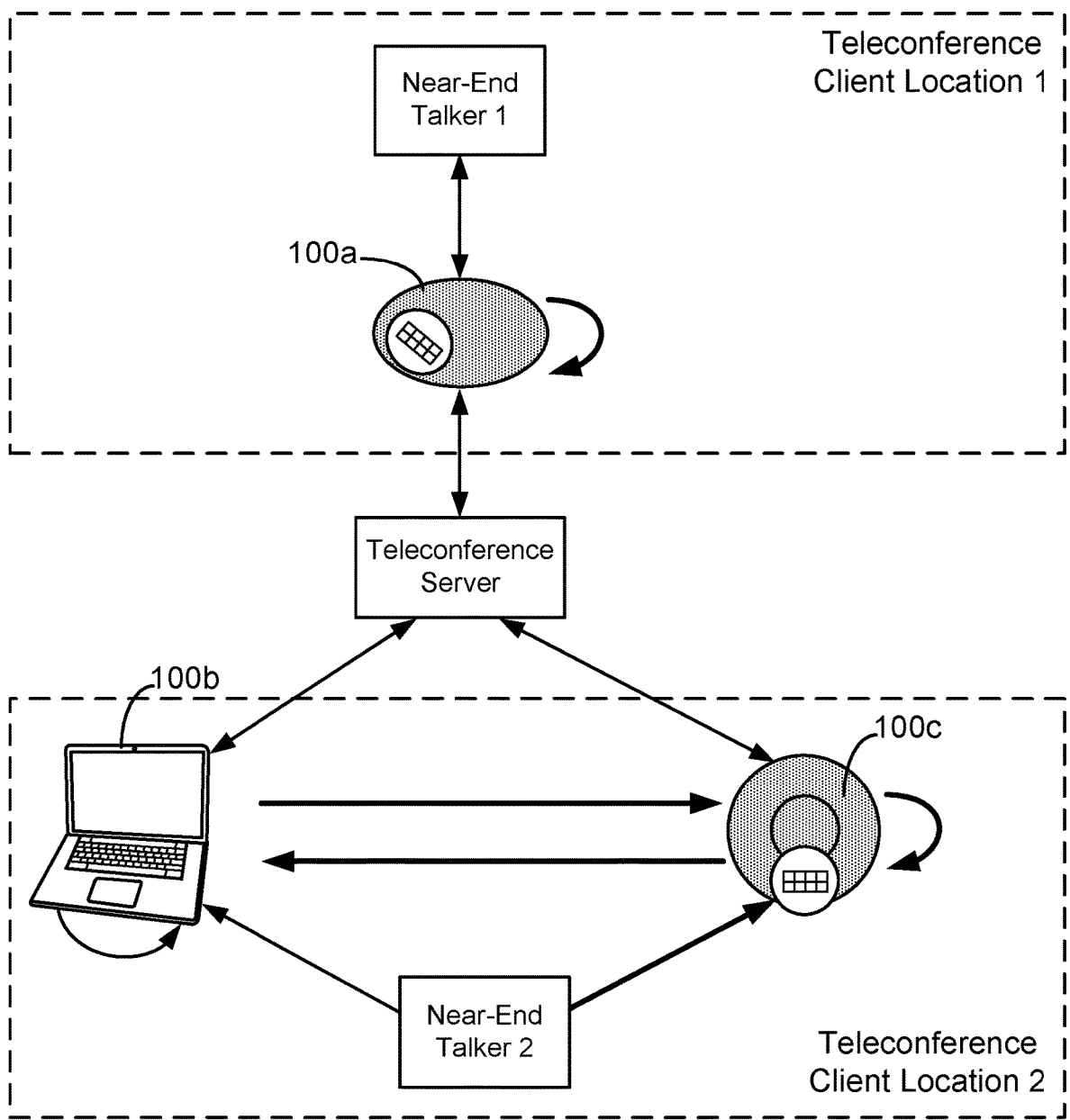
FIG. 1 shows examples of teleconference devices during a teleconference involving two teleconference client locations.

FIG. 1 shows examples of teleconference devices during a teleconference involving two teleconference client locations. In this example, a teleconference server is configured for providing audio connectivity (which may be full-duplex audio connectivity) between a teleconference client device 100a in teleconference client location 1 and teleconference client devices 100b and 100c in teleconference client location 2. Here, the teleconference client devices 100a and 100c are conference phones, whereas teleconference client device 100b is a laptop.

According to this example, teleconference client devices 100b and 100c both have their microphones and speakers enabled. Therefore, the microphones of teleconference client devices 100b and 100c each provide teleconference audio data to the teleconference server corresponding to the speech of near-end talker 2. Accordingly, the teleconference server provides teleconference audio data to teleconference client device 100b corresponding to the speech of near-end talker 2 received by teleconference client device 100c, and also provides teleconference audio data to teleconference client device 100c corresponding to the speech of near-end talker 2 received by teleconference client device 100b.

The speakers of teleconference client devices 100b and 100c each reproduce the speech of near-end talker 2 after a time delay corresponding with the round-trip time for the teleconference audio data to be transmitted from the teleconference client location 2 to the teleconference server and back. When the speakers of teleconference client device 100b reproduce the speech of near-end talker 2, the microphones of teleconference client device 100c detect the reproduced speech of near-end talker 2. Likewise, when the speakers of teleconference client device 100c reproduce the speech of near-end talker 2, the microphone(s) of teleconference client device 100b detect the reproduced speech of near-end talker 2.

Therefore, a howl state can be triggered by the speech of near-end talker 2 in teleconference client location 2. However, the howl state has at least some characteristics that would not be present if the teleconference client devices 100b and 100c were not participating in a teleconference.

Figure 2:
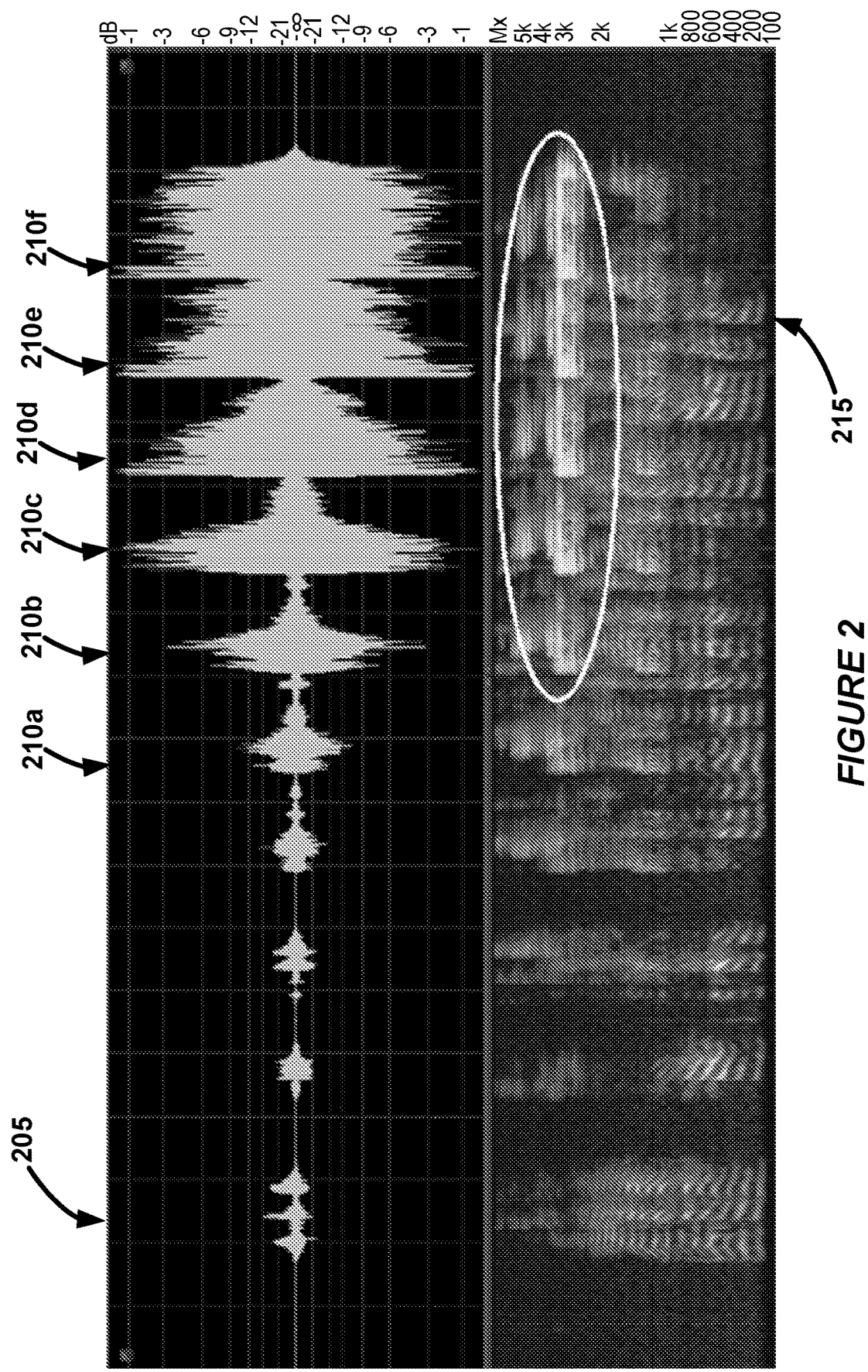
FIG. 2 shows graphs, in the time and frequency domains, of an example of a howl state that may involve two or more teleconference devices in a teleconference client location.

FIG. 2 shows graphs, in the time and frequency domains, of an example of a howl state that may involve two or more teleconference devices in a teleconference client location. Graph 205 is in the time domain, with time represented by the horizontal axis and level, in dB, represented by the vertical axis. Graph 205 shows howl events 210a-210f. The time during which the howl events 210a-210f are taking place may be referred to herein as a "howl state."

It may be observed that the howl events 210a-210f are periodic, or quasi-periodic, and that they increase in amplitude over time. In this example, the periodicity of the howl events 210a-210f corresponds with a time delay corresponding with the round-trip time for the teleconference audio data to be transmitted from a teleconference client location to a teleconference server and back. It also may be observed that the level of speech events (to the left of the howl events 210a-210f) is lower than that of the howl events 210a-210f.

Graph 215 represents the same audio data, including the howl events 210*a*-210*f*, in the frequency domain. It may be observed from graph 215 that most of the energy of the howl events 210*a*-210*f* is concentrated in relatively narrow frequency bands.

Based on many observations made by the inventors, including the data in graphs 205 and 215, the following spectral and temporal characteristics of feedback howl that are distinct from speech have been observed:

The resonance frequencies of the howl events include spectral peaks in single or multiple bands;

Howl events generally have a higher amplitude than that of speech;

Howl events are generally periodic or quasi-periodic in nature and are highly localized in frequency; and The characteristics of howl events have a consistency across time.

Other characteristics of a howl state are described below. As noted above, the howl state has at least some characteristics that would not be present if the devices involved in producing the howl state were not participating in a teleconference. For example, acoustic feedback between a microphone and a speaker of a public address audio system may occur when the microphone is too close to the loudspeaker and/or when the amplification is too large. Such acoustic feedback would generally manifest as a single and continuous howl event, not as a plurality of discontinuous and periodically-occurring howl events. In contrast to acoustic feedback in a public address system context, acoustic feedback in a duplex communication use case may span different networks and different devices. The round-trip time is usually larger than 300 ms, and may be in the range of 500 ms to a second or more. Accordingly, acoustic feedback detection and mitigation in a teleconferencing context may be very different from acoustic feedback detection and mitigation in a public address system context, where the feedback is caused in the same microphone-amplifier-loudspeaker system.

Figure 3:
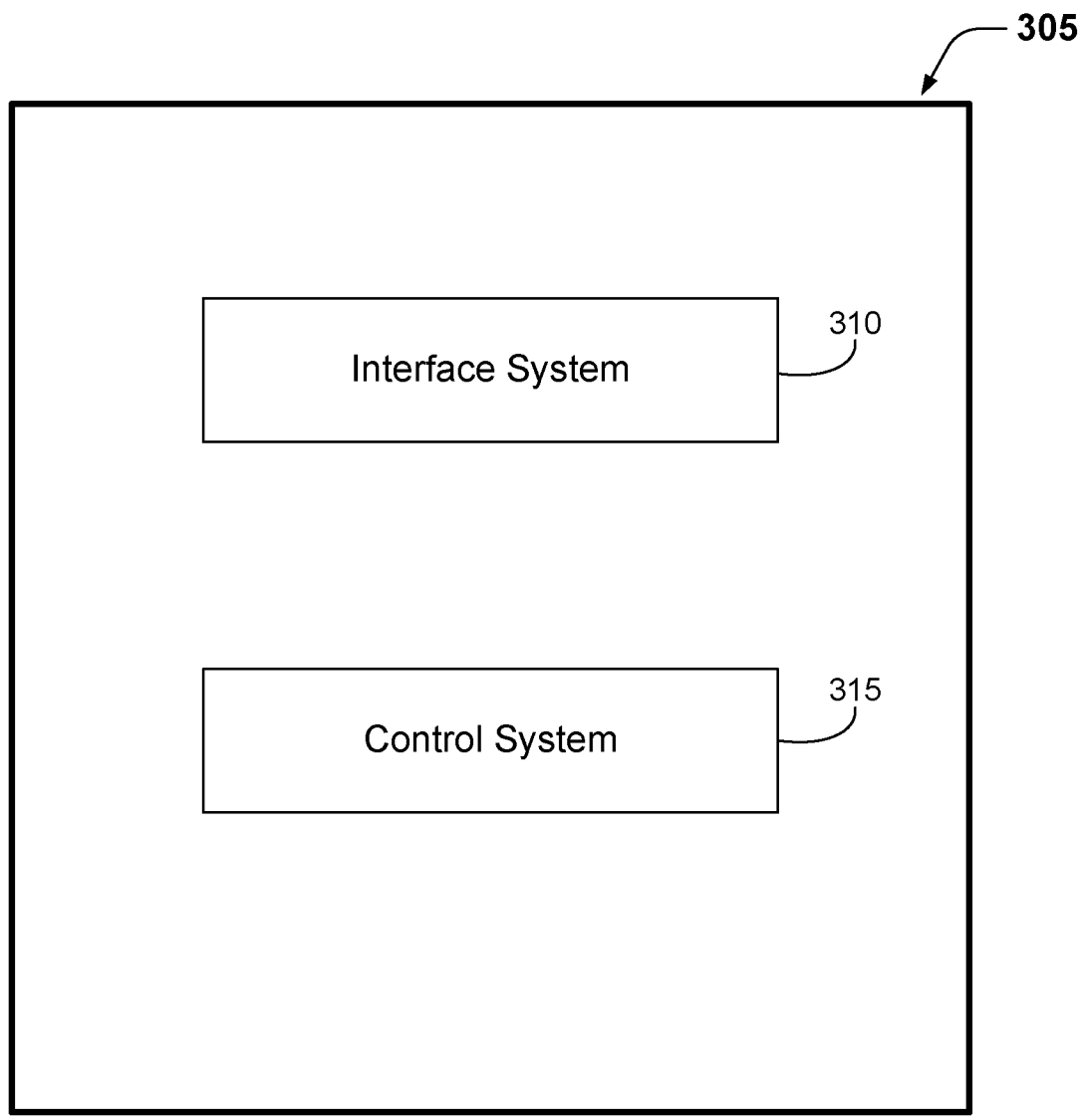
FIG. 3 is a block diagram that shows examples of components of an apparatus that may be configured to perform at least some of the methods disclosed herein.

In view of the above-described observations, some aspects of the present disclosure can provide improved methods for detecting a howl state during a teleconference. FIG. 3 is a block diagram that shows examples of components of an apparatus that may be configured to perform at least some of the methods disclosed herein. In some examples, the apparatus 305 may be a teleconferencing server. In other examples, the apparatus 305 may be a teleconference client device. The components of the apparatus 305 may be implemented via hardware, via software stored on non-transitory media, via firmware and/or by combinations thereof. The types and numbers of components shown in FIG. 3, as well as other figures disclosed herein, are merely shown by way of example. Alternative implementations may include more, fewer and/or different components. For example, if the apparatus 305 is a teleconferencing client device, the apparatus 305 may include one or more microphones, one or more speakers, etc.

In this example, the apparatus 305 includes an interface system 310 and a control system 315. The interface system 310 may include one or more network interfaces, one or more interfaces between the control system 315 and a memory system and/or one or more external device interfaces (such as one or more universal serial bus (USB) interfaces). In some implementations, the interface system 310 may include a user interface system. The user interface system may be configured for receiving input from a user. In some implementations, the user interface system may be configured for providing feedback to a user. For example, the user interface system may include one or more displays with corresponding touch and/or gesture detection systems. In some examples, the user interface system may include one or more speakers. According to some examples, the user interface system may include apparatus for providing haptic feedback, such as a motor, a vibrator, etc. The control system 315 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some examples, the apparatus 305 may be implemented in a single device. However, in some implementations, the apparatus 305 may be implemented in more than one device. In some such implementations, functionality of the control system 315 may be included in more than one device. In some examples, the apparatus 305 may be a component of another device. For example, in some implementations the apparatus 305 may be a component of a server, e.g., a line card.

Figure 4:
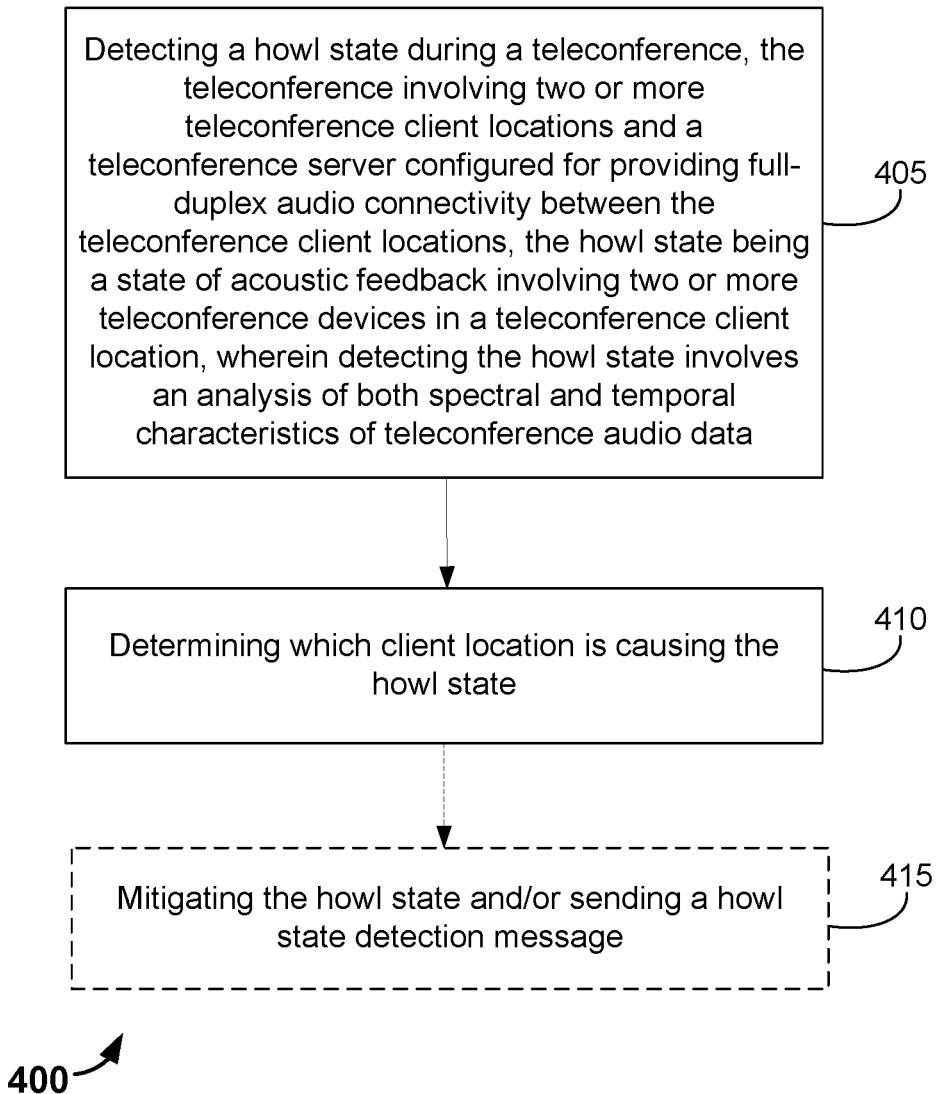
FIG. 4 is a flow diagram that outlines blocks of a method according to one example.

FIG. 4 is a flow diagram that outlines blocks of a method according to one example. The method may, in some instances, be performed by the apparatus of FIG. 3 or by another type of apparatus disclosed herein. In some examples, the blocks of method 400 may be implemented via software stored on one or more non-transitory media. The blocks of method 400, like other methods described herein, are not necessarily performed in the order indicated. Moreover, such methods may include more or fewer blocks than shown and/or described.

In this implementation, block 405 involves detecting a howl state during a teleconference. According to this example, the teleconference involves two or more teleconference client locations and a teleconference server configured for providing full-duplex audio connectivity between the teleconference client locations. Here, the howl state is a state of acoustic feedback involving two or more teleconference devices in a teleconference client location.

In this example, detecting the howl state involves an analysis of both spectral and temporal characteristics of teleconference audio data. Depending on the particular implementation, detecting the howl state may involve calculating a power-based metric according to order statistics of frequency bands, calculating a spectral resonance metric, calculating an inter-percentile range metric, event aggregation, calculating a periodicity metric, detecting envelope similarity, calculating a spectral peakiness metric, a machine-learning-based process and/or estimating a howl presence probability. The terms "metric" and "measure" may be used synonymously herein. In some examples, detecting the howl state may, for example, involve estimating a howl presence probability according to the teleconference audio data. The howl presence probability estimation may be based on a hierarchical rule set or a machine learning method. Detecting the howl state may be based, at least in part, on the howl presence probability. Various examples are described in detail below.

In some instances, the teleconference server may detect the howl state in block 405. However, in some implementations a howl-detection-enabled teleconference device at a teleconference client location may detect the howl state in block 405.

In this example, block 410 involves determining which client location is causing the howl state. In some instances, the teleconference server may determine which client location is causing the howl state in block 410.

However, in some implementations a howl-detection-enabled teleconference device at a teleconference client location may determine which client location is causing the howl state in block 410. The howl-detection-enabled teleconference device may, in some instances, determine that the howl-detection-enabled teleconference device itself, or another teleconference device at the same teleconference client location, it causing the howl state.

Optional block 415 involves mitigating the howl state or sending a howl state detection message. According to some examples, the teleconference server may send the howl state detection message to the client location that is causing the howl state in block 415. In some implementations, mitigating the howl state may involve detecting one or more peak frequency bands of the howl state and applying one or more notch filters corresponding to the one or more peak frequency bands. In some examples, mitigating the howl state may involve muting one or more microphones at the client location that is causing the howl state and/or lowering a speaker volume at the client location that is causing the howl state. In some implementations, a howl-detection-enabled teleconference device at the client location that is causing the howl state may be configured to mitigate the howl state.

Figure 5:
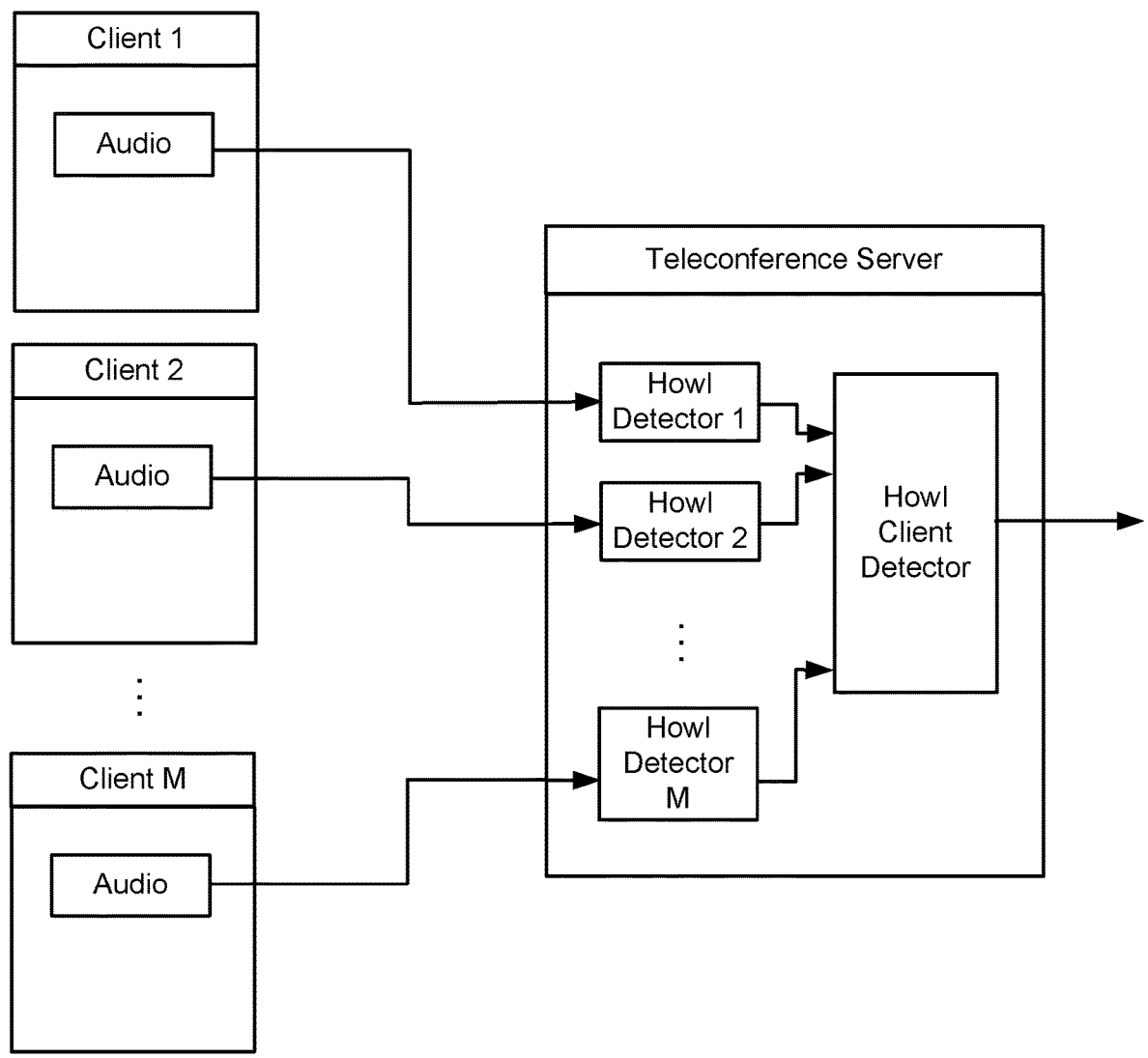
FIG. 5 shows teleconference client device and teleconference server configurations according to one implementation.

FIG. 5 shows teleconference client device and teleconference server configurations according to one implementation. In this example, the teleconference server is configured to detect the howl state based, at least in part, on teleconference audio data received from the teleconference client locations. Here, teleconference client locations 1 through M are participating in a teleconference.

In the example shown in FIG. 5, the teleconference server includes howl detectors 1 through M, each howl detector corresponding with a teleconference client location or a teleconference client device at a client location. According to this implementation, each of the howl detectors 1 through M is configured for detecting a howl state during a teleconference. In this example, the teleconference server also includes a howl client detector configured for determining which client location is causing the howl state.

Here, each of the howl detectors 1 through M is configured for sending a howl state signal to the howl client detector after detecting a howl state. In this implementation, the howl client detector may determine which client location is causing the howl state according to the howl detector from which the howl state signal is received. The teleconference server may be configured for mitigating the howl state and/or sending a howl state detection message to the teleconference client location causing the howl state.

The howl detectors and the howl client detector shown and described herein, including but not limited to those shown in FIG. 5, may be implemented in various ways according to the particular implementation. For example, the howl detectors and the howl client detector may be implemented as part of a control system such as that shown in FIG. 3 and described above. In some examples, the howl detectors and the howl client detector may be implemented via hardware, via software (which may include firmware, resident software, microcodes, etc.) and/or in an embodiment combining both software and hardware aspects. Such embodiments may be referred to herein as a "circuit," a "module" or "engine." In some implementations, the howl detectors and the howl client detector may be implemented via a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Figure 6:
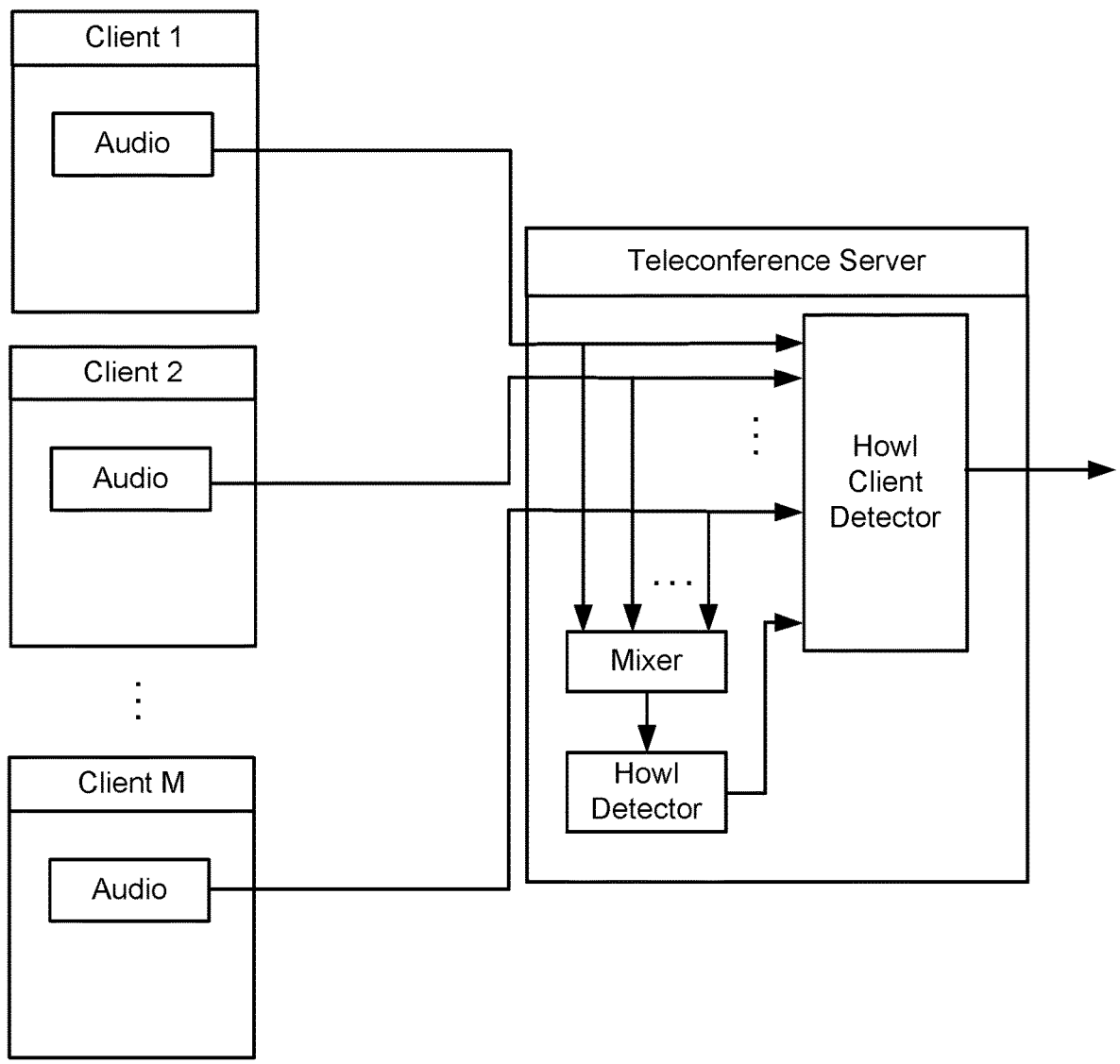
FIG. 6 shows teleconference client device and teleconference server configurations according to another implementation.

FIG. 6 shows teleconference client device and teleconference server configurations according to another implementation. In this example, the teleconference server is configured to detect the howl state based, at least in part, on teleconference audio data received from the teleconference client locations 1 through M, which are participating in a teleconference. In the example shown in FIG. 6, the teleconference server includes a mixer that is configured to mix the teleconference audio data received from the teleconference client locations 1 through M and to output a teleconference audio data mix to the howl detector. In this implementation, the howl detector is configured to detect a howl state based on the teleconference audio data mix.

This type of implementation has potential advantages as compared to the type of implementation shown in FIG. 5, in that multiple howl detectors are not required. Accordingly, this type of implementation can provide relatively lower computational overhead, less power consumption, etc., as compared to the type of implementation shown in FIG. 5.

As in the previous example, the teleconference server shown in FIG. 6 also includes a howl client detector that is configured for determining which client location is causing the howl state. The teleconference server may be configured for mitigating the howl state and/or sending a howl state detection message to the teleconference client location causing the howl state.

Because there is only one howl detector in this example, the howl client detector cannot determine which client location is causing the howl state according to the howl detector from which the howl state signal is received. Therefore, according to some such implementations, the teleconference server may receive teleconference metadata from each of the teleconference client locations 1 through M participating in the teleconference. In some examples, the teleconference metadata may include voice activity detection metadata, level metadata and/or energy metadata. The howl client detector may be configured to determine which client location is causing the howl state based, at least in part, on the teleconference metadata. For example, in some instances the howl client detector may be configured to determine which client location is causing the howl state based, at least in part, on voice activity detection metadata indicating which teleconference client location has a teleconference participant who is currently speaking. This is a reasonable assumption because throughout most of a teleconference or other conversation, one person is talking at a time.

Some implementations may provide a howl client detection algorithm, which also may be referred to as a "blame" algorithm, to correlate regions of howl to a particular teleconference client based on howl detection result in the server and each teleconference client's metadata information received by the teleconference server. In one example, the "blame" algorithm may be as follows:

Run the howl detector on the teleconference audio data mix, which may be represented as $x_{sum}(n)=\text{sum}(x_m(n))$, wherein n represents the frame number and $x_m(n)$ represents a signal denoting the level of the $m^{th}$ teleconference client.

When the howl detector observes a probability of a howl event that exceeds a threshold probability:

Select the current teleconference client(s) whose VAD=True;

Run a cross correlation $R_m(n)$ between the mixed signal $x_{sum}(n)$ and the $m^{th}$ teleconference client $x_m(n)$, such as $R_m(n)=\text{alpha}*R_m(n)+(1-\text{alpha})*R_m(n-1)$. The value of alpha may vary according to the particular implementation. The value of alpha may, for example, depend on the frame rate and/or on a desired length of time for retaining past values of Rm. In some examples, alpha may be 0.95, 0.96, 0.97, 0.98, 0.99, etc. According to some implementations $R_m(n)$ may be smoothed, e.g., with a 1-pole smoothing filter having a time constant in the order of one or more seconds. This smoothing process will retain correlation information for a relatively longer period of time.

Choose the maximum of all $R_m(n)$, which should correspond to the teleconference client m whose level signal is most correlated to the mixed signal. This $m^{th}$ client becomes the detected teleconference client (or client location) that is causing the howl state.

Figure 7:
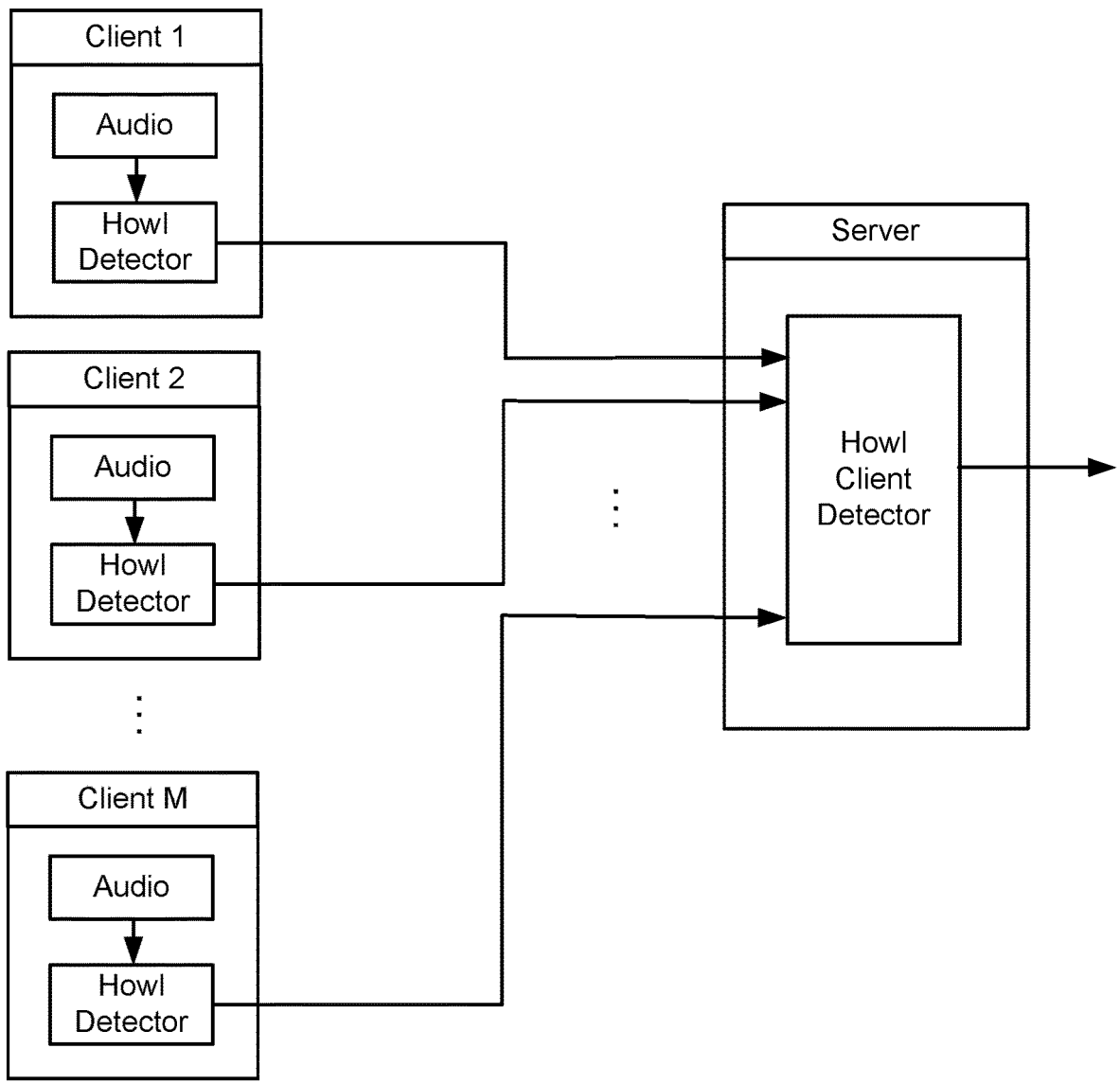
FIG. 7 shows teleconference client device and teleconference server configurations according to still another implementation.

FIG. 7 shows teleconference client device and teleconference server configurations according to still another implementation. In this example, each of the teleconference client locations includes a howl detector. A teleconference device that includes such a howl detector may be referred to herein as a howl-detection-enabled teleconference device at a teleconference client location. In some examples, the howl-detection-enabled teleconference device may be configured to detect a howl state. In some such examples, the howl-detection-enabled teleconference device (or another device at the teleconference client location) may be configured to mitigate the howl state. According to some such examples, no teleconference server involvement may be required for detecting and/or mitigating the howl state.

However, in some alternative implementations, there may nonetheless be some level of teleconference server involvement. According to some such implementations, a teleconference device at a teleconference client location (such as one of the client-side howl detectors shown in FIG. 7) may perform a howl feature extraction process on at least some of the teleconference audio data received by the teleconference device.

The howl feature extraction process may yield howl feature data. The characteristics of the howl feature data may vary according to the details of the howl feature extraction process of a particular implementation. For example, the howl feature data may include one or more features corresponding with a power-based metric, a spectral resonance metric, an inter-percentile range metric, an event aggregation, a periodicity metric, envelope similarity, a spectral peakiness metric, and/or a howl presence probability.

The teleconference device may send at least some of the howl feature data to the teleconference server. According to some such examples, the teleconference server may be configured to detect the howl state based, at least in part, on the howl feature data. The teleconference server may be configured to determine which client location is causing the howl state based, at least in part, on the client location from which the howl feature data are received.

Various howl detection methods are disclosed herein. Some howl detection methods may involve detecting the short-term spectral structural features of howl, the medium-term spectral-temporal structure features of howl and/or the long-term temporal repeat patterns of howl. Such howl detection methods may involve a howl presence probability estimation or a "binary" howl/no howl determination. The detailed discussion below will describe aspects of the following howl detection methods, including:

Order-statistics of a log-domain bands power-based measure may be calculated in order to detect the short-term spectral structures of howl;

A spectral resonance measure may be calculated in order to detect the short-term spectral structures of howl;

A consistent high inter-percentile range measure may be calculated in order to detect the spectral-temporal structure features of howl;

A consistent high resonance measure may be calculated in order to detect the spectral-temporal structure features of howl;

Events (such as potential howl events) may be aggregated in order to detect the long-term temporal repeat patterns of howl;

Periodicity measure based on modulation spectrum may be analyzed in order to detect the long-term temporal repeat patterns of howl;

Envelope similarity may be analyzed in order to detect the long-term temporal repeat patterns of howl;

A howl presence probability estimation may be based on a hierarchical rule set (which may be referred to herein as a hierarchical decision tree) including two or more of the above calculations.

These methods will be described in the following subsections. In some methods, the audio signal may be transformed into the frequency domain and the features may be calculated based on frequency domain audio signals. However, some method operates, at least in part, in the time domain.

Figure 8:
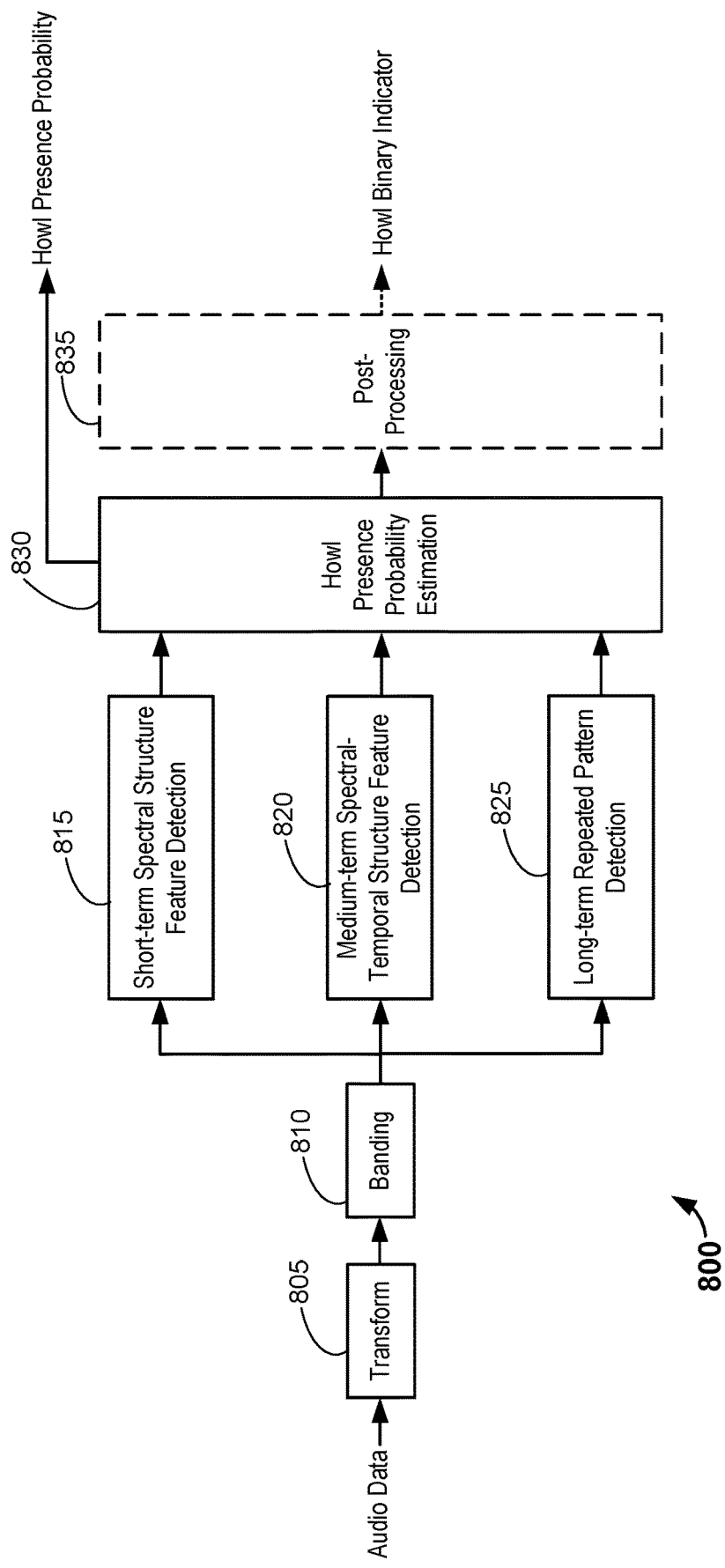
FIG. 8 is a flow diagram that outlines blocks of howl detection methods according to some implementations.

FIG. 8 is a flow diagram that outlines blocks of howl detection methods according to some implementations. The blocks of method 800 may, for example, be implemented by one or more of the devices shown in FIGS. 3 and 5-7. In some examples, the blocks of method 800 may be implemented via software stored on one or more non-transitory media. The blocks of method 800, like other methods described herein, are not necessarily performed in the order indicated. Moreover, such methods may include more or fewer blocks than shown and/or described.

In this example, method 800 begins with audio data being transformed from the time domain to the frequency domain in block 805. The audio data may include teleconference audio data. In this implementation, the transformed audio data are divided into frequency bands in block 810. The number of frequency bands may vary according to the particular implementation. Some implementations (which may correspond to relatively narrow-band audio data) may involve dividing the transformed audio data into 40 audio bands, whereas other implementations may involve dividing the transformed audio data into 48 audio bands (which may correspond to wideband audio data), into 56 audio bands (which may correspond to super-wideband audio data), or into another number of audio bands. According to some examples, block 810 may involve dividing the transformed audio data into logarithmically-spaced bands, whereas other examples may involve dividing the transformed audio data into linearly-spaced bands.

In this example, the transformed and banded audio data are provided to three different howl detection processes: block 815 involves detecting short-term features of spectral structures, block 820 involves detecting medium-term spectral and temporal features and block 825 involves detecting patterns that are repeated over a relatively long term. Examples of each of these howl detection processes are provided below. In some implementations, "medium-term" may be a time period of hundreds of milliseconds, e.g., 150 ms, 200 ms, 250 ms, 300 ms, 350 ms, 400 ms, etc. "Long-term" means longer than medium-term. For example, "long-term" may be on the order of seconds, such as 1 second, 1.5 seconds, 2 seconds, 2.5 seconds, etc. "Short-term" means shorter than medium-term. For example, "short-term" may correspond to tens of milliseconds, e.g., 10 ms, 20 ms, 30 ms, etc. "Short-term" events may, in some examples, be detectable in an individual frame of audio data.

Other examples may involve more or fewer howl detection processes. For example, some alternative methods may involve only two of the three types of howl detection processes shown in FIG. 8. Some methods may involve only one of the three types of howl detection processes, e.g., only block 815 or block 820.

In this example, the results from blocks 815, 820 and 825 are all provided to a howl presence probability estimation process in block 830. In this example, block 830 outputs an indication of howl presence probability. Optional post-processing block 835 receives the indication of howl presence probability and outputs a howl binary indicator, which indicates either a howl state or a no-howl state. In some implementations, method 800 also may include actions responsive to a howl state, such as mitigating the howl state or sending a howl state detection message.

Examples of howl detection processes and metrics are provided in the following paragraphs.

Consistent High-Peakiness Metrics

These metrics provide examples of the processes of block 815. A first such metric, which is referred to herein as a spectral peakiness measure (SPM), is based on the observation that howl audio usually has very high spectral peaks, with energy concentrated in narrow frequency ranges. There are many potential spectral-related measures that can be used to characterize the "peaky" condition of signal spectrum. One of the embodiments of the spectral peakiness measure can be seen in Equation (1), below.

$$SPM(l) = 1 - \frac{\exp\left(\frac{1}{K}\sum_{k=1}^{K} \log(X(k,l))\right)}{\frac{1}{K}\sum_{k=1}^{K} X(k,l)} \quad (1)$$

In Equation 1, X(k) represents the spectral amplitude of band index k, l represents the index of the frame and K represents the number of the frequency bands. In this example, SPM is calculated as one minus the ratio between geometric mean of the band power spectrum and the arithmetic mean of the band power spectrum.

In some examples, the SPM measure of Equation 1 may be smoothed as follows:

$$S\tilde{P}M(l) = \alpha_{SPM} \times S\tilde{P}M(l-1) + (1-\alpha_{SPM}) \times SPM(l) \quad (2)$$

In Equation 2, $$\alpha_{SPM} = 1 - \exp\left(-\frac{N \times T_s}{F_s}\right),$$

N represents the block size and $T_S$ represents a smoothing time constant. The values of N and $T_s$ may vary according to the particular implementation and may depend, for example, on the sampling rate and/or the frame length. In some examples wherein the frame length is 20 ms, N may be 320 for a 16K sampling rate and 640 for a 32K sampling rate. In other examples, the frame length may be 10 ms, 30 ms, etc. According to some implementations, Ts may be 0.04 s, 0.06 s, 0.10 s, 0.12 s, etc.

In some implementations, other spectral-related measures may be used to characterize a peaky condition of a signal spectrum, such as:

A spectral crest measure based on a power ratio between the sum of the peak bands and other bands;

A spectral crest measure based on a peak-to-average band power ratio (in some examples, the average power ratio may be calculated without the peak band(s));

A variance or standard deviation of the power of adjacent spectral bands;

A sum or maximum of spectral band power difference among adjacent frequency bands;

A spectral spread or spectral variance around a spectral centroid; and/or

A spectral entropy metric.

Another measure of peakiness that may be used for howl state detection may be referred to herein as a "consistent high-peakiness measure based on counter." These implementations involve detecting, based on the counter, relatively long blocks having a high peakiness signal. In some such implementations, the counter may be released slowly if the signal is not becoming highly peaky. One example of a consistent high-peakiness measure based on a counter is shown in Equation 3:

$$P_{Counter}(l) = \begin{cases} \min(P_{MaxCounter}, P_{Counter}(l) + (S\tilde{P}M(l) > S\tilde{P}M_{Th})), & \text{if } S\tilde{P}M(l) \geq (S\tilde{P}M_{Th} - S\tilde{P}M_{DownTh}) \\ \max(0, P_{Counter}(l) - P_{CounterDown}), & \text{otherwise} \end{cases} \quad (3)$$

In Equation 3, $P_{Counter}(l)$ represents the counted number of high-peakiness signals, $P_{MaxCounter}$ represents the maximum counter value when long blocks with high peakiness signal are observed, $S\tilde{P}M_{Th}$ represents a threshold for determining a condition of high-peakiness, $S\tilde{P}M_{DownTh}$ represents a threshold of declining $S\tilde{P}M(l)$ and $P_{CounterDown}$ represents a step for decrementing the counter. The values of SPM_Th, SPM_DownTh and P_CounterDown may vary according to the particular implementation. In some examples, SPM_Th may be 0.85, 0.88, 0.90, etc., SPM_DownTh may be 0.05, 0.08, 0.10, etc., and P_CounterDown may be 0.2, 0.5, 1.0, etc. The value of P_CounterDown may depend, for example, on a desired release time.

Consistent High-IPR Metrics

Inter-percentile range (IPR) metrics may be used to detect the contrast between band power in a current frame. Howl audio usually has very high IPR compared with speech and noise signals.

Order-Statistics of Log Domain Band Power

The log domain band power may be expressed as follows: $b(k,l)=10 \log 10(|X(k,l)|^2)$, where k=1, ...,K; l=1, ..., N. In this expression, k represents the index of the band and l represents the index of the frame. The corresponding order statistics version of band power may be denoted as B(1,l), B(2,l), ... B(K,l), respectively, where:

$$B(1,l) \geq B(2,l) \geq \ldots \geq B(K,l) \quad (4)$$

One way of expressing IPR is as follows:

$$IPR(l) = B(r,l) - B(\kappa,l) \quad (5)$$

The values of r and κ have been determined by the inventors according to experiments under various howl conditions. In some examples, r=1 and κ may be expressed as $$\kappa = \text{floor}\left(\frac{100 - \text{Percentile}_{Th}}{100} \times K\right).$$

In some implementations, $\text{Percentile}_{Th}=80$. In other implementations, Percentile may be 82, 85, etc.

In some examples, the original IPR measure may be smoothed, e.g., as follows:

$$I\tilde{P}R(l) = \alpha_{IPR} \times I\tilde{P}R(l-1) + (1-\alpha_{IPR}) \times IPR(l) \quad (6)$$

In Equation 6, $\alpha_{IPR}$ may be expressed as $$\alpha_{IPR} = 1 - \exp\left(-\frac{N \times T_s}{F_S}\right),$$

where N represents the block size and $T_S$ represents a smoothing time constant. As noted above, the values of N and $T_s$ may vary according to the particular implementation and may depend on the sampling rate and/or the frame length. In some examples wherein the frame length is 20 ms, N may be 320 for a 16K sampling rate and 640 for a 32K sampling rate. In other examples, the frame length may be 10 ms, 30 ms, etc. According to some implementations, Ts may be 0.04 s, 0.06 s, 0.10 s, 0.12 s, etc.

Weighting Functions for IPR

In some implementations, some type of weighting function(s) may be used for IPR metrics. Using a well-chosen weighting function can increase the discriminative ability of the original IPR measure. In some examples, the input level may be determined before automatic gain control (AGC) is applied. In some implementations, the input level and a spectral peakiness metric may be used in a weighting function. Equation 7 provides one such example:

$$W_{Level}(l) = \begin{cases} 0, & inLevelDB(l) \le LowTh \\ 1, & inLevelDB(l) \ge HighTh \\ \frac{inLevelDB(l) - LowTh}{HighTh - LowTh}, & \text{otherwise} \end{cases} \quad (7)$$

In Equation 7, inLeveldB represents the input level of a signal. In some examples (which may be examples in which a howl detector is implemented in a teleconference client device), inLeveldB may represent the input level of a signal before AGC is applied. However, in other examples (which may be examples in which a howl detector is implemented in a teleconference server), inLeveldB may represent the input level of a signal after AGC is applied. In one example, LowTh=−60 dB and HighTh=−30 dB. It will be appreciated that the values of LowTh and HighTh may vary according to the particular implementation. One corresponding weighting function for IPR can be expressed as follows:

$$W_{IPR}(l) = W_{Level}(l) \times SPM(l) \quad (8)$$

The IPRComb measure is a weighted version of the above-described IPR measure and may, in some examples, be expressed as follows:

$$I\tilde{P}R_{Comb}(l) = I\tilde{P}R(l) \times W_{IPR}(l) \quad (9)$$

Another useful metric for howl detection may be referred to as the "Consistent High-IPRComb Measure Based on Counter." This metric can be expressed as follows:

$$IPR_{Counter}(l) = \begin{cases} \min(IPR_{MaxCounter}, IPR_{Counter}(l) + (IR\tilde{P}_{Comb}(l) > I\tilde{P}R_{Th})), & \text{if } IPR\tilde{}_{Comb}(l) \ge (I\tilde{R}P_{Th} - I\tilde{P}R_{DownTh}) \\ \max(0, IPR_{Counter}(l) - IPR_{CounterDown}), & \text{otherwise} \end{cases} \quad (10)$$

In Equation 10, $IPR_{Counter}(l)$ represents the counter of the high-IPRComb signal, $IPR_{MaxCounter}$ represents the maximum counter when long blocks with high IPRComb signals are observed, $I\tilde{P}R_{Th}$ represents the threshold of the high-IPRComb metric and $IPR_{CounterDown}$ represents the step of the declining counter. In some examples, IPR_Th may be 12, 15, 18, 20, etc. An example of "long blocks" is a block on the order of 10 or 20 frames, the time duration of which will depend on the frame length. For example, if the frame length is 20 ms, a block on the order of 10 or 20 frames would correspond to a time duration of 200 to 400 milliseconds. Accordingly, this metric provides an example of a process that may occur in block 820 of FIG. 8.

Medium-Term Event-Based Counter

This metric provides another example of a process that may occur in block 820. The medium-term event-based counter may detect repeating patterns of the spectral structure of howl audio during the medium term. In one example, the onset of a howl event can be detected based on $P_{Counter}(l)$ and $IPR_{Counter}(l)$, as follows:

$$\text{Event}_{Onset} = (IPR_{Counter}(l) \ge IPR_{CounterTh}) \&\& (P_{Counter}(l) \ge P_{CounterTh}) \quad (11)$$

The medium-term event counter may be expressed as follows:

$$\text{Event}_{Counter}(l) = \begin{cases} \min(\text{Event}_{MaxCounter}, \text{Event}_{Counter}(l) + \text{Event}_{Onset}), & \text{if } (IPR_{Counter}(l) \ge (IPR_{CounterTh} - IPR_{DownTh})) \\ & \&\& (P_{Counter}(l) \ge (P_{CounterTh} - P_{DownTh})) \\ \max(0, \text{Event}_{Counter}(l) - \text{Event}_{CounterDown}), & \text{otherwise} \end{cases} \quad (12)$$

In Equation 12, $\text{Event}_{Counter}(l)$ represents the counter of the medium-term howl event, $\text{Event}_{MaxCounter}$ represents the maximum counter of medium-term howl events and $\text{Event}_{CounterDown}$ represents the step of the declining event counter. In this example, the counter is used to detect repeating patterns of the spectral structure of howl in the medium term. Here, if the value of the counter increases, the likelihood of the howl presence also increases. In this example, the maximum counter represents the highest possible likelihood of howl presence, e.g., 1. In this implementation, CounterDown represents the step size for decreasing the counter. When the counter value decreases, this indicates that the likelihood of howl presence is declining.

Long-Term Signal Variability Measure

This metric is an example of a process that could correspond to block 825 of FIG. 8. In some examples, a smoothed bands power metric may be determined as follows:

$$\tilde{S}(k,l)=\alpha_X \times \tilde{S}(k,l-1)+(1-\alpha_X)\times |X(k,l)|^2 \quad (13)$$

In some implementations, spectral entropy during a time domain analysis window may be expressed as follows:

$$\eta(k,l) = -\sum_{n=l-R+1}^{l} \frac{S(k,n)}{\sum_{m=l-R+1}^{l} S(k,m)} \log\left(\frac{S(k,n)}{\sum_{m=l-R+1}^{l} S(k,m)}\right) \quad (14)$$

η(k,l) is essentially an entropy measure of a normalized short-term spectrum computed at band k over R consecutive frames, ending at the $l^{th}$ frame. According to some examples, a long-term signal variability measure LTSV may be computed as follows:

$$LTSV(l) = \frac{1}{K}\sum_{k=1}^{K} (\eta(k,l) - \overline{\eta(k,l)})^2 \quad (15)$$

In this example, the signal variability measure LTSV is the sample variance of entropies (computed according to Equation 14) for K bands. In Equation (15), $$\text{the term } \overline{\eta(k,l)} = \frac{1}{K}\sum_{k=1}^{K} \eta(k,l) \quad (16)$$

Long-Term Event-Based Periodicity

This metric is another example of a process that could correspond to block 825 of FIG. 8. The inventors have observed that howl in a teleconferencing context often shows long-term repeated patterns that may, for example, occur over a period of two or more seconds.

Figure 9:
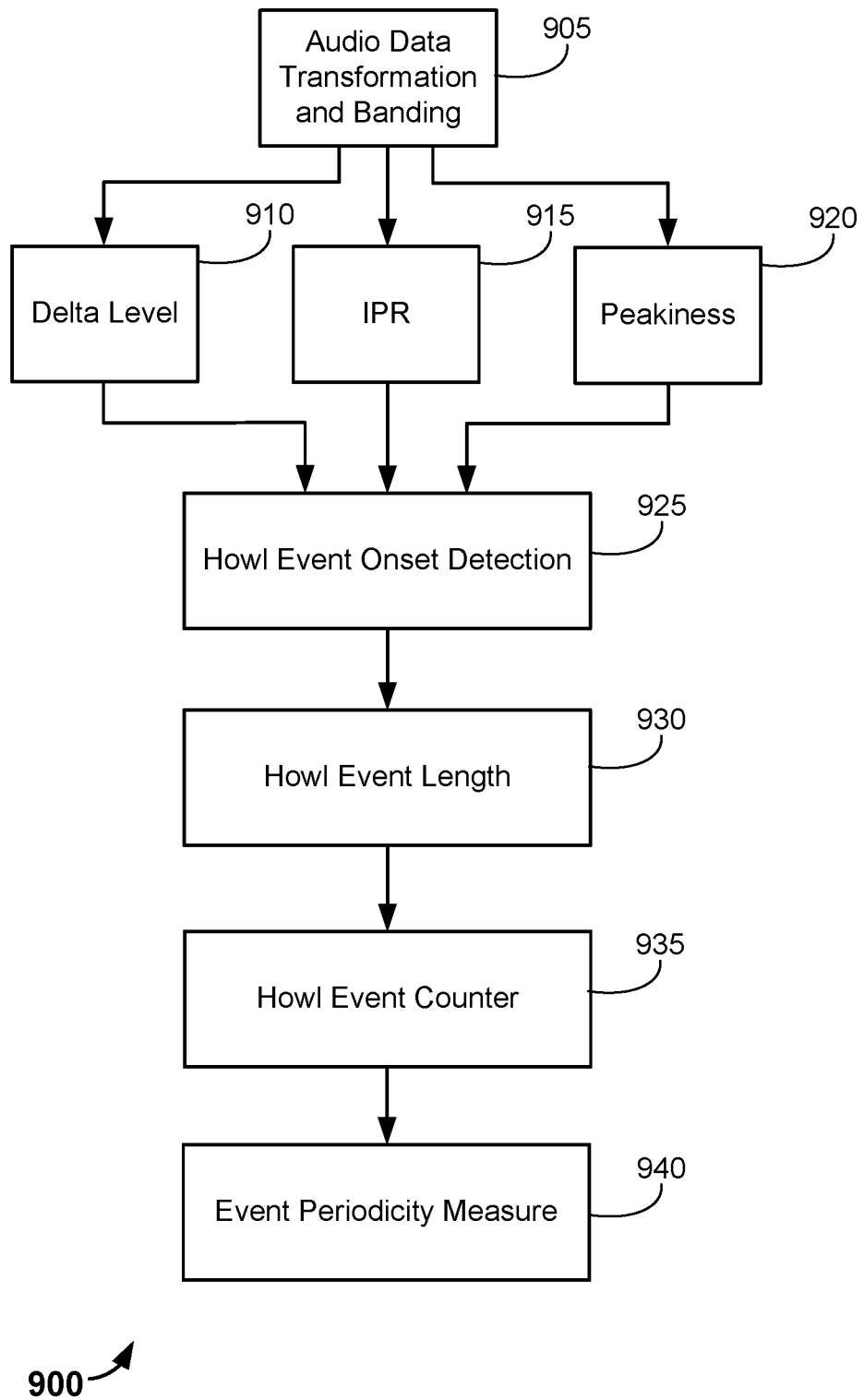
FIG. 9 is a flow diagram that shows example blocks of a howl event periodicity detection method.

FIG. 9 is a flow diagram that shows example blocks of a howl event periodicity detection method. The blocks of method 900 may, for example, be implemented by one or more of the devices shown in FIGS. 3 and 5-7. In some examples, the blocks of method 900 may be implemented via software stored on one or more non-transitory media. The blocks of method 900, like other methods described herein, are not necessarily performed in the order indicated. Moreover, such methods may include more or fewer blocks than shown and/or described.

In this example, method 900 begins with received audio data being transformed from the time domain to the frequency domain in block 905. The audio data may include teleconference audio data. In this implementation, the transformed audio data are also divided into frequency bands in block 905.

In order to count howl events and determine howl event lengths, some type of howl event onset detection is needed. In this example, the transformed and banded audio data are provided to three different processes for determining howl onset detection metrics. Other implementations may involve determining more or fewer howl onset detection metrics. In this example, block 910 involves a "delta level" process for determining whether there is a level increase that is characteristic of a howl event. In some examples, this level increase threshold may be 20 dB, 25 dB, 30 dB, etc. Here, block 915 involves evaluating IPR. Block 915 may, for example, involve one or more types of IPR calculation methods such as those described above. According to this implementation, block 920 involves one or more types of peakiness detection, which can represent the spectral structure of the howl event onset. Block 920 may involve one or more of the peakiness detection methods described above.

In this example, howl onset detection metrics output from the processes of blocks 910-920 are provided to a howl event onset detection process in block 925. In some examples, the howl onset detection metrics output from the processes of blocks 910-920 are given equal weight during the howl event onset detection process, whereas in other examples one of the metrics may be given more weight than others. When the onset of a howl event has been detected, a howl event onset detection indication is input to the process of block 930, wherein the howl event length is determined. For example, in block 930 one or more howl event detection methods may be invoked, e.g., one or more of the short-term howl event detection methods that are disclosed herein. According to this example, after the howl event length has been determined in block 935, method 900 proceeds to a howl event counter process (block 935).

In this implementation, a result of the howl event counter process (which may include a detected howl event number) is provided to the event periodicity measuring process(es) of block 940. In some examples, block 940 may involve applying one or more heuristic rules to derive a periodicity measure, e.g., as follows:

$$\text{EventPeriodicity}=\max(0,\min(1,(\text{EventCount}-\text{EventNumTh})\times\text{PeriodicityStep})) \quad (17)$$

In Equation 17, EventCount represents a detected howl event number; EventNumTh represents a threshold of the howl event presence number and PeriodicityStep represents an increased step of periodicity. According to one example, EventNumTh is 2 and PeriodicityStep is 0.5. However in alternative examples, EventNumTh may be 1.5, 1.8, etc. In other examples, PeriodicityStep may be 0.4, 0.6, etc.

According to some examples, a recursive averaging method may be invoked in order to provide further smoothing of the event-based periodicity measure, e.g., as follows:

$$\overline{\text{EventPeriodicity}}=(1-\alpha_{smooth})\times \text{EventPeriodicity}+\alpha_{smooth}\times \overline{\text{EventPeriodicity}} \quad (18)$$

In Equation 18, $\alpha_{smooth}$ represents a smoothing coefficient. In some examples $\alpha_{smooth}$ may be 0.85, 0.9, 0.95, etc.

Long-Term Level-Based Periodicity

Some implementations involve determining a long-term periodicity metric that is based on audio signal levels. The inventors have observed that the amplitude modulation spectrum of howl events in a teleconferencing context often shows a long-term repeated pattern.

Figure 10:
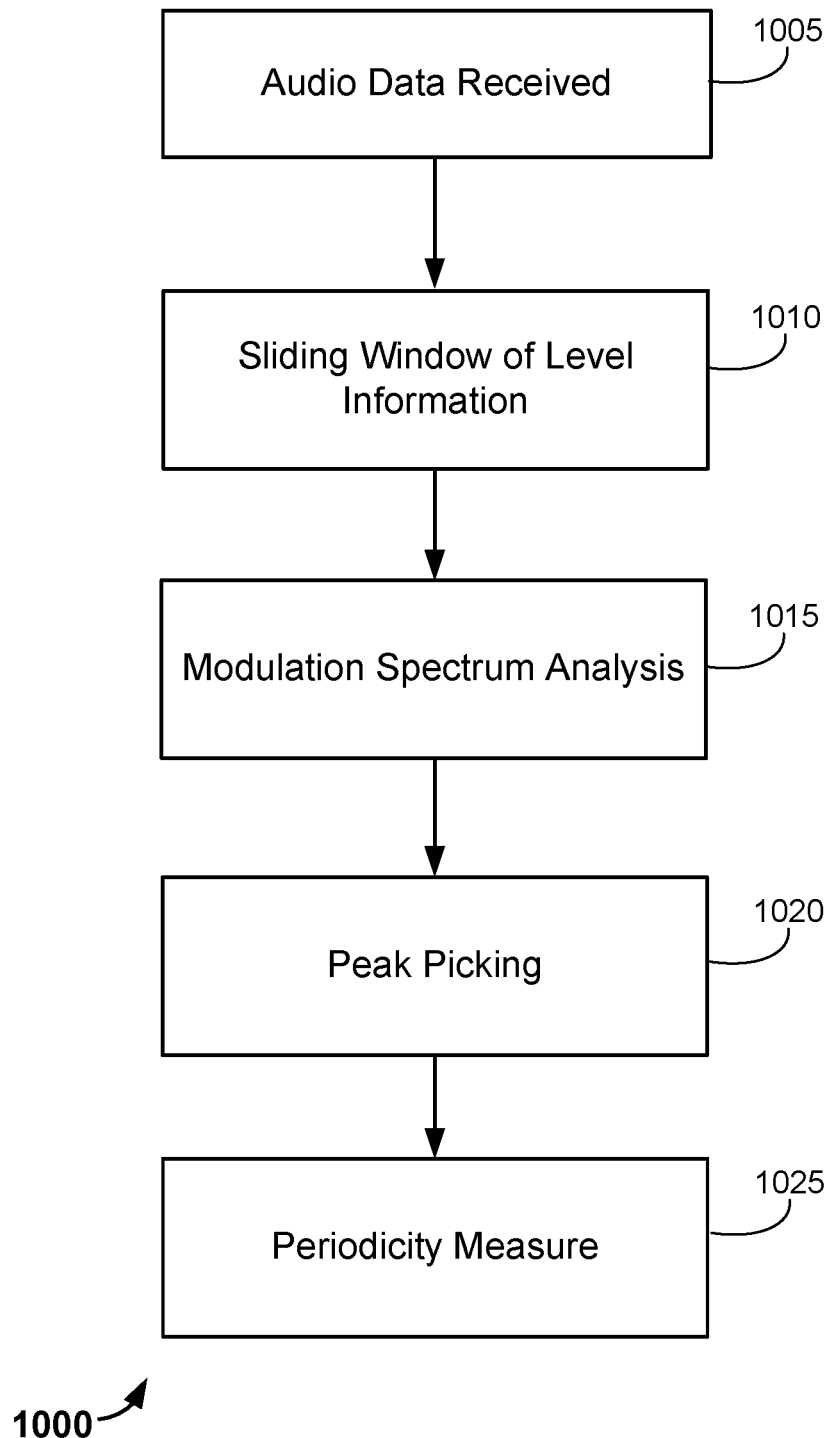
FIG. 10 is a flow diagram that shows example blocks of another method of measuring howl event periodicity.

FIG. 10 is a flow diagram that shows example blocks of another method of measuring howl event periodicity. The blocks of method 1000 may, for example, be implemented by one or more of the devices shown in FIGS. 3 and 5-7. In some examples, the blocks of method 1000 may be implemented via software stored on one or more non-transitory media. The blocks of method 1000, like other methods described herein, are not necessarily performed in the order indicated. Moreover, such methods may include more or fewer blocks than shown and/or described.

In this example, method 1000 begins with audio data being received in block 1005. The audio data may include teleconference audio data. In this implementation, the received audio data are provided to block 1010. Here, block 1010 involves evaluating level information in audio data according to a sliding time window. In one example, the sliding time window may be 128 frames of audio data. In other examples, the sliding time window may be longer or shorter. In some examples, the level information may be determined prior to an AGC process.

According to this example, the results of block 1010 are provided to block 1015, which involves a process of modulation spectrum analysis. In some examples, block 1015 involves fast Fourier transform (FFT) calculations. For example, the modulation spectrum analysis of block 1015 may involve a Fourier transform of the long-term level information in the sliding time window. The results of block 1015 are provided to the peak picking process of block 1020. The peak value of the modulation spectrum is selected in block 1020 because the peak value represents periodicity information. A periodicity measure may then be determined in block 1025, based on the results of block 1020. For example, a peak level selected in block 1020 may indicate the onset of a howl event. A corresponding peak level may be identified later in time and may be correlated with the earlier peak level.

Howl Presence Probability

In some implementations, a local howl presence probability may be based on a linear interpolation of IPR values, e.g., as follows:

$$P_{Local}(l) = \begin{cases} 0, \tilde{IPR}(l) \leq \tilde{IPR}_{Low} \\ 1, \tilde{IPR}(l) \geq \tilde{IPR}_{High} \\ \frac{\tilde{IPR}(l) - \tilde{IPR}_{Low}}{\tilde{IPR}_{High} - \tilde{IPR}_{Low}}, \text{otherwise} \end{cases} \quad (19)$$

Alternatively, or additionally, a global howl presence probability may be determined. In some examples, a global howl presence probability may be based on a counter-based consistency measure, as follows:

$$P_{Global}(l) = \min\left(1, \frac{IPR_{Counter}(l)}{IPR_{MaxCounter}(l)} \times \frac{P_{Counter}(l)}{P_{MaxCounter}(l)}\right) \quad (20)$$

A raw howl probability may, in some examples, be defined as follows:

$$P(l) = P_{Local}(l) P_{Global}(l) \quad (21)$$

Figure 11:
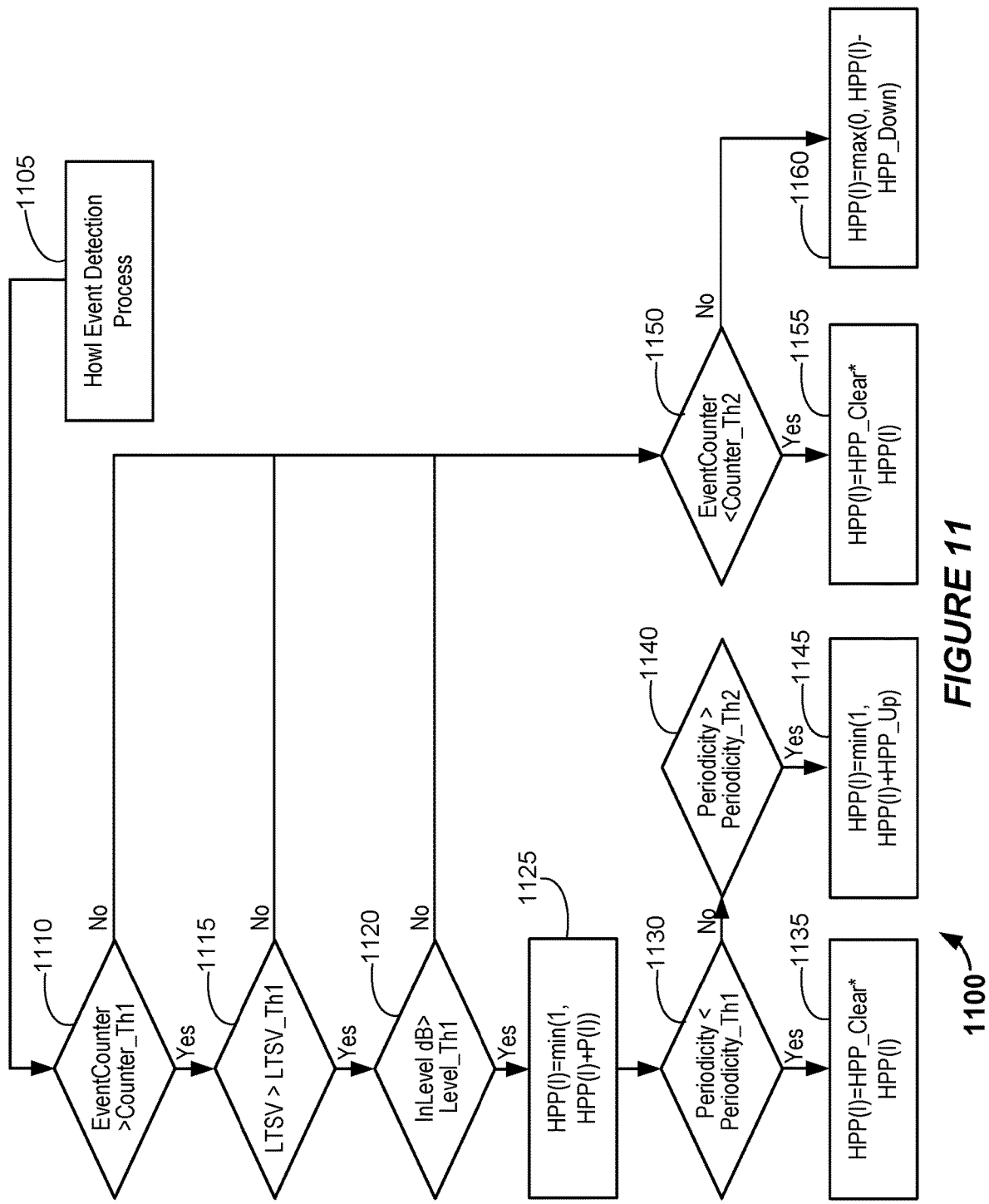
FIG. 11 is a flow diagram that shows blocks of a howl presence probability determination method according to one example.

FIG. 11 is a flow diagram that shows blocks of a howl presence probability determination method according to one example. The blocks of method 1100 may, for example, be implemented by one or more of the devices shown in FIGS. 3 and 5-7. In some examples, the blocks of method 1100 may be implemented via software stored on one or more non-transitory media. The blocks of method 1100, like other methods described herein, are not necessarily performed in the order indicated. Moreover, such methods may include more or fewer blocks than shown and/or described.

In this example, the salient features of method 1100 begin after the howl event detection process of block 1105, which may be performed according to any of the above-described howl event detection methods. Although not shown in FIG. 11, block 1105 may involve other processes according to the particular implementation, such as receiving audio data, transforming the audio data to the frequency domain, banding, etc. Here, block 1110 involves determining whether a number of howl events has exceeded a first howl event counter threshold, which also may be referred to as a medium-term event counter high threshold. In some examples, the medium-term event counter high threshold may be 10, 12, 13, etc. If it is determined in block 1110 that the number of howl events has exceeded the first howl event counter threshold, the process continues to block 1115.

However, if it is determined in block 1110 that the number of howl events has not exceeded the first howl event counter threshold, the process continues to block 1150, wherein it is determined whether a number of howl events is less than a second howl event counter threshold, which also may be referred to as a medium-term event counter low threshold. In some examples, the medium-term event counter low threshold may be 5, 6, 7, etc. If it is determined in block 1150 that the number of howl events is less than the second howl event counter threshold, the process continues to block 1155, which involves reducing the current howl presence probability (HPP). In this example, block 1155 involves multiplying the current HPP value by HPP_Clear, which is a constant for reducing the HPP value quickly if the probability of a false alarm is high. In some examples, the value of HPP_Clear may be 0.1, 0.2, 0.3, etc.

However, if it is determined in block 1150 that the number of howl events is not less than the second howl event counter threshold, the process continues to block 1160. In this example, block 1160 involves setting the current HPP value to the greater of zero or the value of (HPP(l) [the current HPP value]–HPP_Down). According to this example, HPP_Down is a constant for reducing the value of HPP. In some examples, the value of HPP_Down may be 0.02, 0.03, 0.04, etc.

As noted above, if it is determined in block 1110 that the number of howl events has exceeded the first howl event counter threshold, the process continues to block 1115. Here, block 1115 involves evaluating signal variability. In this example, block 1115 involves determining whether the long-term signal variability (LTSV) is greater than an LTSV threshold value, denoted LTSV_Th1 in FIG. 11. In some examples, the value of LTSV_Th1 may be 0.15, 0.2, 0.25, etc. If it is determined in block 1115 that LTSV is not greater than LTSV_Th1, the process proceeds to block 1150. However, if it is determined in block 1115 that the LTSV is greater than LTSV_Th1, the process continues to block 1120.

In this implementation, block 1120 involves determining whether one or more level values of the audio input data exceed a threshold. In some examples, the level value(s) may be determined prior to an AGC process. According to this implementation, block 1120 involves determining whether InLeveldB>Level_Th1. In some examples, the value of LTSV_Th1 may be −60 Db, −65 Db, −70 Db, etc. If it is determined in block 1120 that InLeveldB is not greater than LTSV_Th1, the process proceeds to block 1150. However, if it is determined in block 1120 that InLeveldB>Level_Th1, the process continues to block 1125 in this example.

In this implementation, block 1125 involves setting the current HPP value to the lesser of 1 or the sum of the current HPP value and the "raw" howl probability, which may in some examples be determined according to Equation 21. The process then proceeds to block 1130.

In this implementation, block 1130 involves determining whether a howl event periodicity metric is less than a first howl event periodicity threshold, which is denoted Periodicity_Th1 in FIG. 11. In some examples, the value of Periodicity_Th1 may be 0.2, 0.3, 0.4, 0.5, etc. If it is determined in block 1130 that the howl event periodicity metric is less than Periodicity_Th1, the process continues to block 1135. Here, block 1135 involves reducing the current HPP. In this example, block 1135 involves multiplying the current HPP value by HPP_Clear.

However, if it is determined in block 1130 that the howl event periodicity metric is not less than the first howl event periodicity threshold, the process proceeds to block 1140 in this example. Here, block 1140 involves determining whether the howl event periodicity metric is greater than a second howl event periodicity threshold, which is denoted Periodicity_Th2 in FIG. 11. In some examples, the value of Periodicity_Th2 may be 0.80, 0.85, 0.90, etc. In this example, if it is determined in block 1140 that the howl event periodicity metric is not greater than Periodicity_Th2, the current HPP value will not be changed. However, if it is determined in block 1140 that the howl event periodicity metric is greater than Periodicity_Th2, the process continues to block 1145.

In this implementation, block 1145 involves setting the current HPP value to the lesser of 1 or the sum of the current HPP value and a constant that is denoted HPP_Up in FIG. 11. HPP_Up is a value used to incrementally increase the current value of HPP. In some examples, the value of HPP_Up may be 0.1, 0.15, 0.2, etc.

An HPP value may be output after the foregoing processes have been completed. Although this is not shown in FIG. 11, the process may continue as additional howl events are detected.

In alternative implementations, an HPP value may be determined according to one or more other methods. For example, an HPP value may be determined according to a machine learning based method such as regression a decision tree method, an Adaptive Boosting algorithm, a Gaussian Mixture Model, a Hidden Markov Model or a deep neural network.

Post-Processing to Determine a Howl Binary Indicator

As described above with reference to block 835 of FIG. 8, some implementations may involve a post-processing step after determining an HPP value or a similar howl probability value. Some such implementations may involve a voting-based decision smoothing process. If we define the binary indicator of a howl state in frame l as I(l) and the voting ratio in an observation window R as V(l), the voting ratio may be expressed as follows:

$$V(l) = \frac{I(l)}{\sum_{m=l-R+1}^{l} I(m)} \quad (22)$$

The binary decision smoothing can be performed as follows:

$$I(l) = I(l) \& (V(l) \geq Vth) \quad (23)$$

In Equation 23, Vth represents a voting ratio threshold, which may vary according to the particular implementation. In some examples, Vth may be 0.5, 0.6, 0.7, etc.

According to some implementations, a median filter method may be used for further binary decision smoothing. In some such implementations, the binary indicator of a howl state in frame l may be expressed as follows:

$$I(l) = \text{median}\{I(l-M+1), I(l-M+2), \ldots, I(l)\} \quad (24)$$

In Equation 24, M represents a length of a median filter window. In some examples, M may be in the range of 3, 4, 5, etc.

RMS-Based Envelope Similarity Determination in the Time Domain

Figure 12:
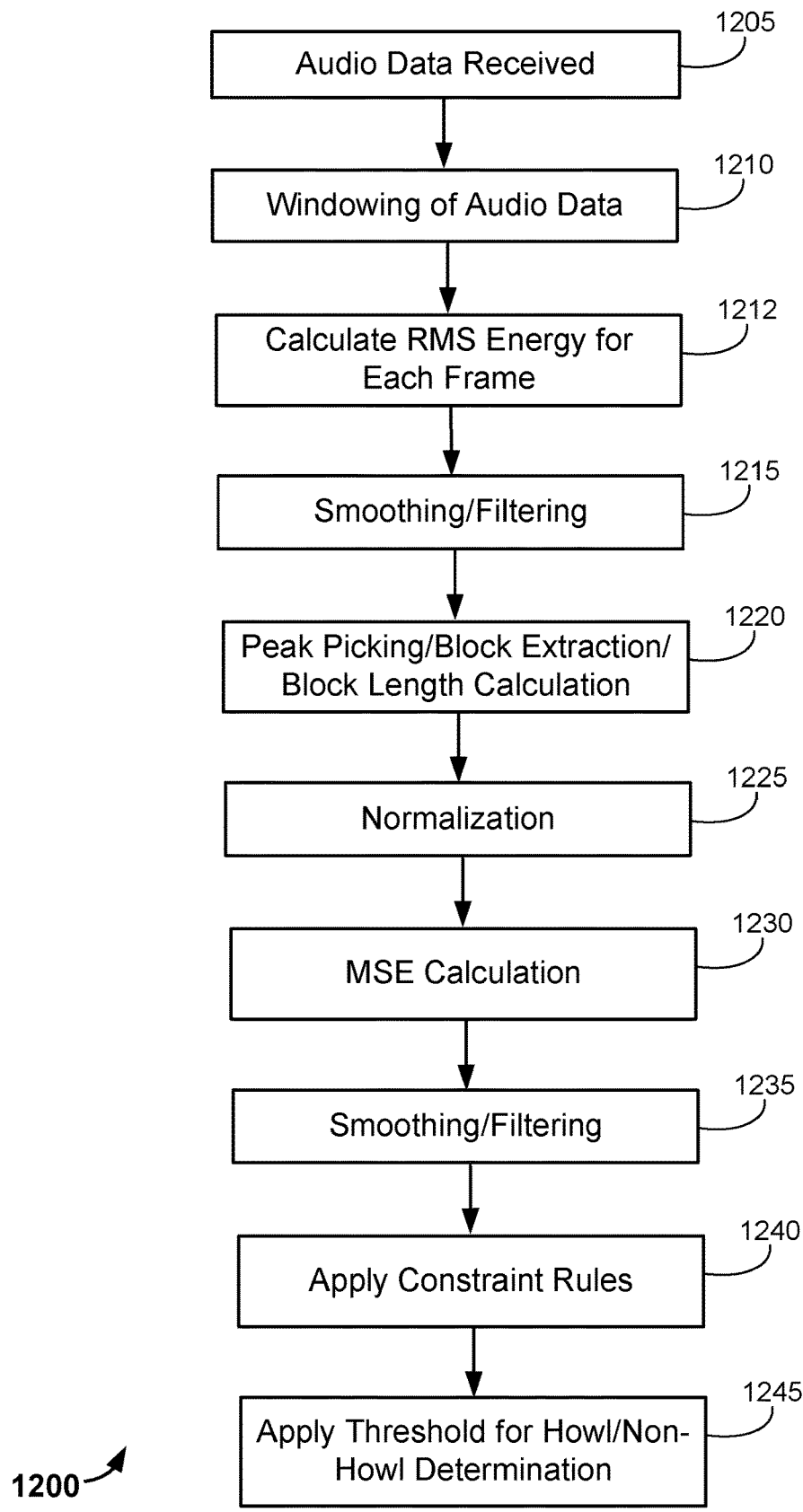
FIG. 12 is a flow diagram that shows example blocks of a method of determining signal envelope similarity.

FIG. 12 is a flow diagram that shows example blocks of a method of determining signal envelope similarity. The blocks of method 1200 may, for example, be implemented by one or more of the devices shown in FIGS. 3 and 5-7. In some examples, the blocks of method 1200 may be implemented via software stored on one or more non-transitory media. The blocks of method 1200, like other methods described herein, are not necessarily performed in the order indicated. Moreover, such methods may include more or fewer blocks than shown and/or described.

In this example, method 1200 begins with audio data being received in block 1205. The audio data may include teleconference audio data. In this implementation, the received audio data are provided to block 1210 without a transformation to the frequency domain. In this example, block 1210 involves windowing of the time-domain audio signal. In one such example, the frame length is 10 ms and the time-domain audio signal is first windowed via a Hamming window having a window length of 20 ms. However, the type of windowing process and the window length may vary according to the particular implementation. In some alternative examples a Hanning window may be applied. In some examples, the window size may be 25 ms, 30 ms, etc.

The process then continues to block 1212, wherein the RMS energy for each frame is calculated. In one implementation, the RMS energy for each frame is calculated as follows:

$$x_{rms} = \sqrt{\frac{1}{N}\sum_{i=1}^{n} x_i^2} = \sqrt{\frac{x_1^2 + x_2^2 + \ldots + x_n^2}{N}} \quad (25)$$

In Equation 25, $x_i$ (i=1, 2, . . . , N) are the samples of the frame.

The process then proceeds to the smoothing and filtering processes of block 1215 in this example. In some implementations, block 1215 involves obtain a smoothed RMS envelope by applying median filtering to the RMS energy calculated in block 1212, e.g., as follows:

$$x_{rms}(i) = \text{Med}[x_{rms}(i-N), \ldots, x_{rms}(i), \ldots, x_{rms}(i+N)] \quad (26)$$

Accordingly, the median filtering operation may involve sorting the RMS energy and selecting values in the $50^{th}$ percentile. The results of block 1215 are provided to block 1220. According to this example, block 1220 involves, for the smoothed RMS envelope, a peak-picking method that is used to find the RMS peaks. The peak-picking method may, in some examples, selecting local maximum RMS values. In this example, the blocks between two adjacent peaks are extracted and then the length of the remaining blocks is calculated. This length may be used as a constraint condition for envelope periodicity in some implementations.

The RMS blocks are then normalized in block 1225. In some examples, block 1225 involves using the maximal RMS values, e.g., as follows:

$$vrms1 = vrms1/\max(abs(vrms1)) \quad (27)$$

$$vrms2 = vrms2/\max(abs(vrms2)) \quad (28)$$

In Equations 27 and 28, vrms1 and vrms2 represent two adjacent blocks among three peaks.

In this implementation, the mean square error (MSE) of the smooth RMS of two blocks is then calculated in block 1230. According to some examples, block 1230 may involve calculating the MSE as follows:

$$MSE = \text{sum}((vrms1 - vrms2)\hat{\ }2)/\text{length}(vrms1) \quad (29)$$

In this example, the smoothing process of block 1235 follows, in order to alleviate the fluctuation of MSE among peaks. According to some such examples, block 1235 involves a median filtering process to obtain smoothed MSE values.

The inventors have observed that the length of corresponding howl events in a teleconferencing context may be very similar. By using the lengths of blocks corresponding to howl events, one can construct a kind of constraint rule that may be applied to the smoothed MSE values. In this way, one can obtain final MSE values.

Therefore, according to this example, constraint rules are then applied in block 1240. In some examples, the constraint rules may be based, at least in part, on the maximum length and the ratio of len1 and len2, where len1 and len2 represent the lengths of the above-referenced vrms1 and vrms2, respectively. If the maximum length is too long or the ratio is too small or too big, this may indicate that the difference between len1 and len2 is too large. Therefore, according to some examples, the MSE values may be increased. If the ratio nearly equals to 1, and the ratios over several blocks (for example, over 4 or 5 blocks) are nearly equal to 1, this may indicate that the envelopes have strong similarity. Therefore, according to some such examples, the MSE values may be decreased.

By selecting and applying an appropriate threshold of MSE values, a binary indication of howl events may then be derived in block 1245. According to some implementations, the threshold for MSE values may be small, e.g., 0.015, 0.02, 0.025, 0.03, etc. In some examples, the output may be 1 for a howl event and 0 for a non-howl event.

Energy-Based Envelope Similarity Determination in the Frequency Domain

In some implementations, envelope similarity metrics can be calculated in the frequency domain based on energy. According to Parseval's Theorem, $$E = \sum_{n=-\infty}^{\infty} |x[n]|^2 = \frac{1}{2\pi} \int_{-\pi}^{\pi} |X(e^{jw})|^2 dw \quad (30)$$

In Equation 30, E represents energy.

In one example of determining energy-based envelope similarity, an audio signal may be windowed and then transformed to the frequency domain, e.g., by using an FFT or a modified discrete cosine transform. In some examples, the energy for each frame may be calculated as follows:

$$E = \frac{1}{N} \sum_{k=0}^{N-1} |X[k]|^2 \quad (31)$$

In Equation 31, X[k] represents a coefficient in the frequency domain, k represents the frequency index and N represents the frame length. A filter may then be applied in order to obtain a smooth envelope. For example, a moving average filter may be applied:

$$y(k) = \frac{1}{N} \sum_{i=0}^{N-1} x(k+i) \quad (32)$$

In Equation 32, N represents the length of the moving average filter, the value of which may differ according to the implementation. In some examples, the value of N may be 3, 5, 7, etc. According to some implementations, the peaks of the envelope may then be picked and the MSE values may be calculated. In some examples, these processes may be performed as described above with reference to blocks 1220-1245 of FIG. 12.

Energy-Based Envelope Similarity Determination in the Sub-Band Domain

Howl events may occur in several frequency bands. Therefore, collective decisions in the sub-band domain can help determine envelope similarity.

One implementation of determining sub-band domain envelope similarity may start by windowing a received audio signal and then transforming the audio signal to the frequency domain, e.g., by using an FFT or a modified discrete cosine transform. The resulting broad-band signal may be divided into sub-bands, e.g., according to psycho-acoustic principles. The number of sub-bands may, for example, be based on the sampling rate of the broad-band signal. In one example involving a 16 kHz sampling rate, the broad-band signal may be divided into 48 sub-bands. In other examples involving a 32 kHz sampling rate, the broad-band signal may be divided into 56 or 64 sub-bands.

The process may then proceed substantially as described in the preceding section. However, some examples of this method may involve outputting not only binary non-howl or howl event indications (e.g., 1 and 0), but also outputting an indication of uncertainty (e.g., 0.5) in the howl event determination. For example, a howl event may be mixed with a speech signal and this may result in an ambiguous howl event determination result.

Figure 13:
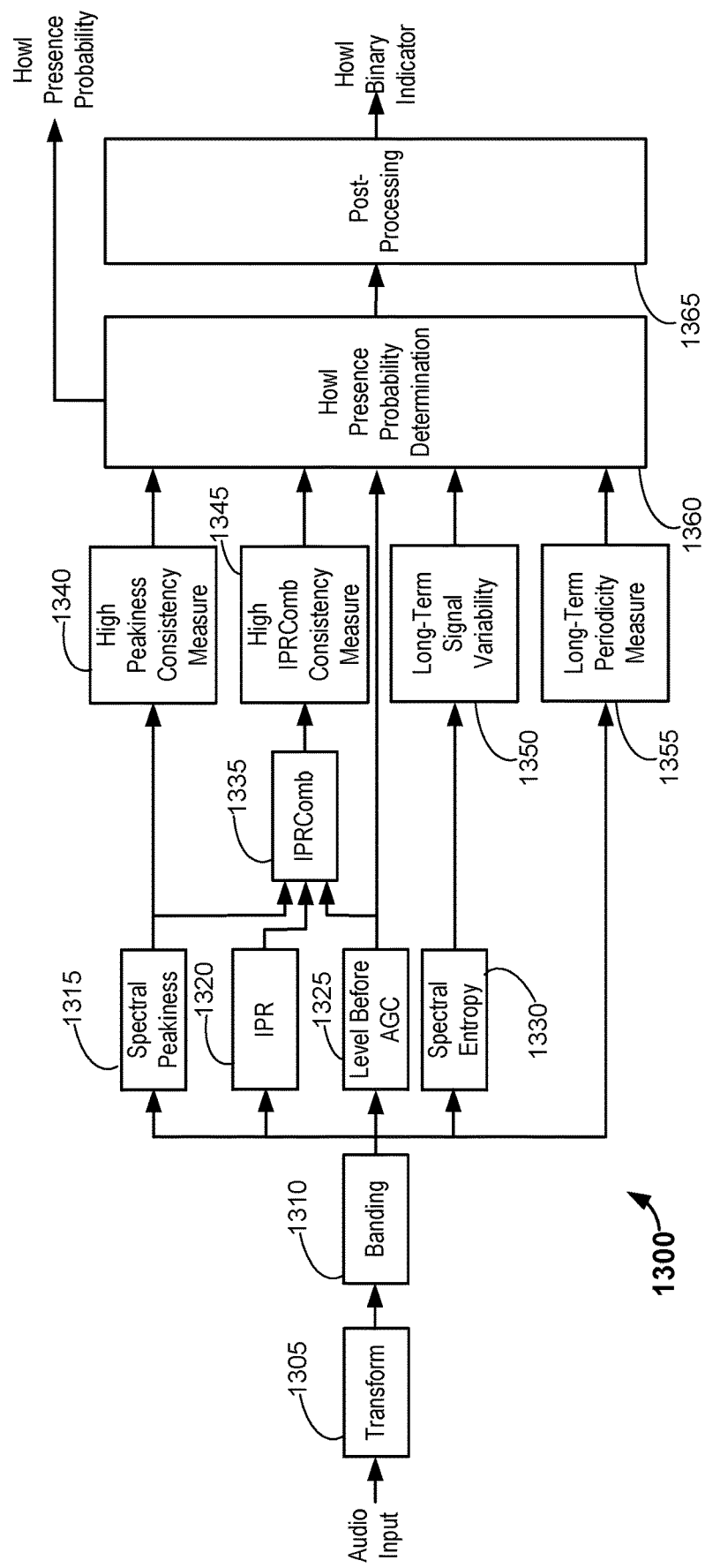
FIG. 13 is a flow diagram that outlines blocks of howl detection methods according to some implementations.

FIG. 13 is a flow diagram that outlines blocks of howl detection methods according to some implementations. The blocks of method 1300 may, for example, be implemented by one or more of the devices shown in FIGS. 3 and 5-7. The processes that are referenced by the blocks of FIG. 13 may be performed according to any of the corresponding above-described methods. In some examples, the blocks of method 1300 may be implemented via software stored on one or more non-transitory media. The blocks of method 1300, like other methods described herein, are not necessarily performed in the order indicated. Moreover, such methods may include more or fewer blocks than shown and/or described.

In this example, method 1300 begins with audio data being transformed from the time domain to the frequency domain in block 1305. The audio data may include teleconference audio data. In this implementation, the transformed audio data are divided into frequency bands in block 1310.

In this example, the transformed and banded audio data are provided to four different howl detection processes: according to this implementation, block 1315 involves detecting spectral peakiness, block 1320 involves determining IPR, block 1325 involves determining signal level before AGC is applied to the audio data and block 1330 involves a spectral entropy determination process. In this implementation, the results of block 1315, 1320 and 1325 are provided to the IPRComb block, which in turn provides input to the High IPRComb Consistency Measure block 1345. In this example, the results of block 1315 are also provided to the High Peakiness Consistency Measure block 1340. Here, the results of block 1330 are also provided to the Long-Term Signal Variability block 1350.

According to this implementation, the results of blocks 1325, 1340, 1345, 1350 and 1355 are provided to the Howl Presence Probability Determination block 1360. In this example, block 1360 outputs a measure of howl presence probability, which is also referred to herein as HPP. Here, block 1360 also provides input to Post-Processing block 1365, which outputs a binary howl/no howl indication. In some examples, method 1300 may involve mitigating a howl state or sending a howl state detection message.

Various modifications to the implementations described in this disclosure may be readily apparent to those having ordinary skill in the art. The general principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Various aspects of the present disclosure may be appreciated from the following enumerated example embodiments (EEEs):

1. A teleconferencing method, comprising:
detecting a howl state during a teleconference, the teleconference involving two or more teleconference client locations and a teleconference server configured for providing full-duplex audio connectivity between the teleconference client locations, the howl state being a state of acoustic feedback involving two or more teleconference devices in a teleconference client location, wherein detecting the howl state involves an analysis of both spectral and temporal characteristics of teleconference audio data; and determining which client location is causing the howl state.
2. The method of EEE 1, further comprising at least one of mitigating the howl state or sending a howl state detection message.
3. The method of EEE 1 or EEE 2, wherein the teleconference server determines which client location is causing the howl state.
4. The method of any one of EEEs 1-3, wherein the teleconference server detects the howl state.
5. The method of EEE 4, wherein:
a teleconference device at a teleconference client location performs a howl feature extraction process on at least some of the teleconference audio data, the howl feature extraction process yielding howl feature data;
the teleconference device sends the howl feature data to the teleconference server; and
the teleconference server detects the howl state based, at least in part, on the howl feature data.
6. The method of EEE 4, wherein the teleconference server detects the howl state based, at least in part, on teleconference audio data received from one or more of the teleconference client locations.
7. The method of EEE 6, wherein the teleconference server creates a teleconference audio data mix comprising teleconference audio data received from the teleconference client locations and wherein the teleconference server detects the howl state based on the teleconference audio data mix.
8. The method of EEE 7, wherein the teleconference server receives teleconference metadata from the teleconference client locations and wherein the teleconference server determines which client location is causing the howl state based, at least in part, on the teleconference metadata.
9. The method of EEE 8, wherein the teleconference metadata includes one or more of voice activity detection metadata, level metadata or energy metadata.
10. The method of EEE 1, further comprising estimating a howl presence probability according to the teleconference audio data, wherein detecting the howl state is based, at least in part, on the howl presence probability.
11. The method of EEE 10, wherein the howl presence probability estimation is based on a hierarchical rule set or a machine learning method.
12. The method of EEE 1, wherein a howl-detection-enabled teleconference device at a teleconference client location detects the howl state.
13. The method of EEE 12, wherein the howl-detection-enabled teleconference device mitigates the howl state.
14. The method of any one of EEEs 1-13, wherein detecting the howl state involves one or more processes selected from a list of processes consisting of: calculating a power-based metric according to order statistics of frequency bands; calculating a spectral resonance metric; calculating an inter-percentile range metric; event aggregation; calculating a periodicity metric; detecting envelope similarity; calculating a spectral peakiness metric; a machine-learning-based process; and estimating a howl presence probability.
15. One or more non-transitory media having software stored thereon, the software including instructions for controlling one or more devices to perform the method of any one of EEEs 1-14.
16. A teleconferencing apparatus, comprising:
means for detecting a howl state during a teleconference, the teleconference involving two or more teleconference client locations and a teleconference server configured for providing full-duplex audio connectivity between the teleconference client locations, the howl state being a state of acoustic feedback involving two or more teleconference devices in a teleconference client location, wherein detecting the howl state involves an analysis of both spectral and temporal characteristics of teleconference audio data; and means for determining which client location is causing the howl state.
17. The teleconferencing apparatus of EEE 16, further comprising means for mitigating the howl state.
18. The teleconferencing apparatus of EEE 16 or EEE 17, further comprising means for sending a howl state detection message.
19. The teleconferencing apparatus of any one of EEEs 16-18, wherein detecting the howl state is based, at least in part, on teleconference audio data received from one or more of the teleconference client locations.
20. The teleconferencing apparatus of any one of EEEs 16-19, further comprising means for creating a teleconference audio data mix comprising teleconference audio data received from the teleconference client locations, wherein detecting the howl state is based, at least in part, on the teleconference audio data mix.
21. The teleconferencing apparatus of any one of EEEs 16-20, wherein detecting the howl state is based, at least in part, on teleconference metadata received from the teleconference client locations.
22. The teleconferencing apparatus of EEE 21, wherein the teleconference metadata includes one or more of voice activity detection metadata, level metadata or energy metadata.

23. The teleconferencing apparatus of any one of EEEs 16-22, further comprising means for estimating a howl presence probability according to the teleconference audio data, wherein detecting the howl state is based, at least in part, on the howl presence probability.

24. The teleconferencing apparatus of EEE 23, wherein the howl presence probability estimation is based on a hierarchical rule set or a machine learning method.

25. The teleconferencing apparatus of any one of EEEs 16-24, wherein detecting the howl state involves one or more processes selected from a list of processes consisting of: calculating a power-based metric according to order statistics of frequency bands; calculating a spectral resonance metric; calculating an inter-percentile range metric; event aggregation; calculating a periodicity metric; detecting envelope similarity; calculating a spectral peakiness metric; a machine-learning-based process; and estimating a howl presence probability.

26. A teleconferencing server, comprising:
an interface system configured for communication between the teleconferencing server and teleconference client locations; and
a control system configured for:
providing full-duplex audio connectivity during a teleconference between two or more teleconference client locations;
detecting, during the teleconference, a howl state, the howl state being a state of acoustic feedback involving two or more teleconference devices in a teleconference client location, wherein detecting the howl state involves an analysis of both spectral and temporal characteristics of teleconference audio data; and
determining which client location is causing the howl state.

27. The teleconferencing server of EEE 26, wherein the control system is configured for at least one of mitigating the howl state or sending a howl state detection message.

28. The teleconferencing server of EEE 26 or EEE 27, wherein the control system is configured for determining which client device is causing the howl state.

29. The teleconferencing server of any one of EEEs 26-28, wherein the control system is configured for detecting the howl state based, at least in part, on teleconference audio data received from one or more of the teleconference client locations.

30. The teleconferencing server of any one of EEEs 26-29, wherein the control system is configured for:
creating a teleconference audio data mix comprising teleconference audio data received from the teleconference client locations; and
detecting the howl state based on the teleconference audio data mix.

31. The teleconferencing server of EEE 30, wherein the control system is configured for: receiving, via the interface system, teleconference metadata from the teleconference client locations; and
determining which client location is causing the howl state based, at least in part, on the teleconference metadata.

32. The teleconferencing server of EEE 31, wherein the teleconference metadata includes one or more of voice activity detection metadata, level metadata or energy metadata.

33. The teleconferencing server of any one of EEEs 26-32, wherein the control system is configured for estimating a howl presence probability according to teleconference audio data received from one or more of the teleconference client locations, wherein detecting the howl state is based, at least in part, on the howl presence probability.

34. The teleconferencing server of EEE 33, wherein the howl presence probability estimation is based on a hierarchical rule set or a machine learning process.

35. The teleconferencing server of any one of EEEs 26-34, wherein detecting the howl state involves one or more processes selected from a list of processes consisting of: calculating a power-based metric according to order statistics of frequency bands; calculating a spectral resonance metric; calculating an inter-percentile range metric; event aggregation; calculating a periodicity metric; detecting envelope similarity; calculating a spectral peakiness metric; a machine-learning-based process; and estimating a howl presence probability.

36. The teleconferencing server of any one of EEEs 26-35, wherein the control system is configured for:
receiving, via the interface system, howl feature data from a teleconference device at a teleconference client location, the howl feature data being the result of a howl feature extraction process performed by the teleconference device; and
detecting the howl state based, at least in part, on the howl feature data.

37. A teleconferencing client device, comprising:
an interface system configured for communication between the teleconference client device and a teleconferencing server configured for providing full-duplex audio connectivity during a teleconference between a plurality of teleconference client locations; and
a control system configured for:
detecting a howl state during the teleconference, the howl state being a state of acoustic feedback involving the teleconferencing client device and at least one other device in a teleconference client location that includes the teleconferencing client device, wherein detecting the howl state involves an analysis of both spectral and temporal characteristics of teleconference audio data; and
mitigating the howl state.

38. The teleconferencing client device of EEE 37, wherein detecting the howl state involves one or more processes selected from a list of processes consisting of: calculating a power-based metric according to order statistics of frequency bands; calculating a spectral resonance metric; calculating an inter-percentile range metric; event aggregation; calculating a periodicity metric; detecting envelope similarity; calculating a spectral peakiness metric; a machine-learning-based process; and estimating a howl presence probability.

39. A teleconferencing client device, comprising:
an interface system configured for communication between the teleconference client device and a teleconferencing server configured for providing full-duplex audio connectivity during a teleconference between a plurality of teleconference client locations; and
a control system configured for:
performing a howl state feature extraction process during the teleconference, the howl state feature extraction process involving extracting howl feature data that is relevant to detecting a howl state, the howl state being a state of acoustic feedback involving the teleconferencing client device and at least one other device in a teleconference client location that includes the teleconferencing client device, wherein the howl state feature extraction process involves an analysis of both spectral and temporal characteristics of teleconference audio data; and sending the howl feature data to the teleconferencing server.

40. The teleconferencing client device of EEE 39, wherein performing a howl state feature extraction process involves one or more processes selected from a list of processes consisting of: calculating a power-based metric according to order statistics of frequency bands; calculating a spectral resonance metric; calculating an inter-percentile range metric; event aggregation; calculating a periodicity metric; detecting envelope similarity; calculating a spectral peakiness metric; a machine-learning-based process; and estimating a howl presence probability.

The invention claimed is:

1. A teleconferencing server, comprising:
an interface system configured for communication between the teleconferencing server and teleconference client locations; and
a control system configured for:
providing full-duplex audio connectivity during a teleconference between two or more teleconference client locations;
detecting, during the teleconference, a howl state, the howl state being a state of acoustic feedback involving two or more teleconference devices in a teleconference client location, wherein detecting the howl state includes:
receiving teleconference audio data from one or more of the teleconference client locations,
transforming teleconference audio data from time domain to frequency domain,
dividing the transformed audio data in frequency bands,
detecting, in said transformed and banded audio data, at least one of short-term spectral features or medium-term spectral and temporal features, the short-term spectral features and medium-term spectral and temporal features being structural features of a howl, wherein short-term is in the order of tens of milliseconds and medium-term is in the order of hundreds of milliseconds,
estimating a howl presence probability and outputting a howl binary indicator, indicative of a presence of the howl state; and
determining which client location is causing the howl state.

2. The teleconferencing server of claim 1, wherein short-term spectral features include a spectral peakiness measure (SPM), related to energy concentrated in narrow frequency ranges.

3. The teleconferencing sever of claim 1, wherein short-term spectral features include an inter-percentile range (IPR), where the IPR for frame l is defined as IPR(l)= B(1,l)−B(k,l), where B(r,l) is the r:th order statistics version of band power for frame l, and k is a predefined portion of the number of frequency bands.

4. The teleconferencing sever of claim 3, wherein k is 20%, 18% or 15% of the number of frames.

5. The teleconferencing server of claim 3, wherein IPR(l) is weighted using an input level and a spectral peakiness measure (SPM) in a weighting function.

6. The teleconferencing server of claim 1, wherein the control system is configured for at least one of mitigating the howl state or sending a howl state detection message.

7. The teleconferencing server of claim 1, wherein the control system is configured for determining which client device is causing the howl state.

8. The teleconferencing server of claim 1, wherein the control system is configured for:
creating a teleconference audio data mix comprising said teleconference audio data received from the teleconference client locations; and
detecting the howl state based on the teleconference audio data mix.

9. The teleconferencing server of claim 1, wherein the control system is configured for:
receiving, via the interface system, teleconference metadata from the teleconference client locations; and
determining which client location is causing the howl state based, at least in part, on the teleconference metadata.

10. The teleconferencing server of claim 1, wherein the howl presence probability estimation is based on a hierarchical rule set or a machine learning process.

11. The teleconferencing server of claim 1, wherein the short-term spectral features and medium-term spectral and temporal features are selected from a list of consisting of: a power-based metric according to order statistics of frequency bands; a spectral resonance metric; an inter-percentile range metric; event aggregation; a periodicity metric; envelope similarity; and a spectral peakiness metric.

12. The teleconferencing server of claim 1, wherein the control system is configured for:
receiving, via the interface system, howl feature data from a teleconference device at a teleconference client location, the howl feature data being the result of a howl feature extraction process performed by the teleconference device; and
detecting the howl state based, at least in part, on the howl feature data.

13. A computer program product comprising a non-transitory computer-readable media storing a program to be executed by one or more processors of a teleconferencing server when retrieved from a non-transitory computer-readable medium, the program code including instructions which configure the teleconferencing server in accordance with the teleconferencing server of claim 1.

* * * * *